(12) United States Patent
Hattori et al.

(10) Patent No.: US 7,706,051 B2
(45) Date of Patent: Apr. 27, 2010

(54) DISPLAY MEDIUM AND METHOD OF MANUFACTURING DISPLAY MEDIUM

(75) Inventors: Yasuhiro Hattori, Cordova, TN (US); Hiroyuki Enomoto, Toyohashi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 403 days.

(21) Appl. No.: 11/690,817

(22) Filed: Mar. 24, 2007

(65) Prior Publication Data
US 2007/0188442 A1 Aug. 16, 2007

Related U.S. Application Data

(63) Continuation-in-part of application No. PCT/JP2005/014941, filed on Aug. 16, 2005.

(30) Foreign Application Priority Data

Sep. 30, 2004 (JP) ............................. 2004-289075
Oct. 21, 2004 (JP) ............................. 2004-307180

(51) Int. Cl.
*G02B 26/00* (2006.01)
*G02B 26/08* (2006.01)
*G02F 1/29* (2006.01)
(52) U.S. Cl. .................. 359/296; 359/290; 359/298
(58) Field of Classification Search ......... 359/290–292, 359/295, 296, 298
See application file for complete search history.

(56) References Cited
U.S. PATENT DOCUMENTS
6,741,386 B2 * 5/2004 Minami ....................... 359/296

FOREIGN PATENT DOCUMENTS

| JP | 2000-035769 A | 2/2000 |
|----|---------------|--------|
| JP | 2003-015166 A | 1/2003 |
| JP | 2003-108035 A | 4/2003 |
| JP | 2003-202601 A | 7/2003 |
| JP | 2003-270674 A | 9/2003 |
| JP | 2003-114452 A | 4/2007 |
| WO | 03/016994 A1 | 2/2003 |

OTHER PUBLICATIONS

International Bureau Of WIPO, International Preliminary Report on Patentability for Related Application No. PCT/JP2005/014941, dated Apr. 3, 2007.
European Patent Office, Supplementary European Search Report for Application No. EP 05 78 0495.7-2205, dated Aug. 8, 2008.

* cited by examiner

*Primary Examiner*—Scott J Sugarman
*Assistant Examiner*—Brandi N Thomas
(74) *Attorney, Agent, or Firm*—Baker Botts L.L.P.

(57) ABSTRACT

A display medium includes a pair of substrates, an electrophoretic medium, and a partitioning medium. The pair of substrates is disposed in spaced-apart relation and substantially parallel to each other. The electrophoretic medium is disposed between the pair of substrates and contains charged particles. An electric field generated between the pair of substrates causes the charged particles contained in the electrophoretic medium to migrate for switching a display state. The partitioning medium has fluidity and is phase-separated from the electrophoretic medium at least at room temperature. The partitioning medium is in a phase-separated state phase-separated from the electrophoretic medium. The partitioning medium is disposed between the pair of substrates as a partition to partition the electrophoretic medium.

33 Claims, 14 Drawing Sheets

(b)

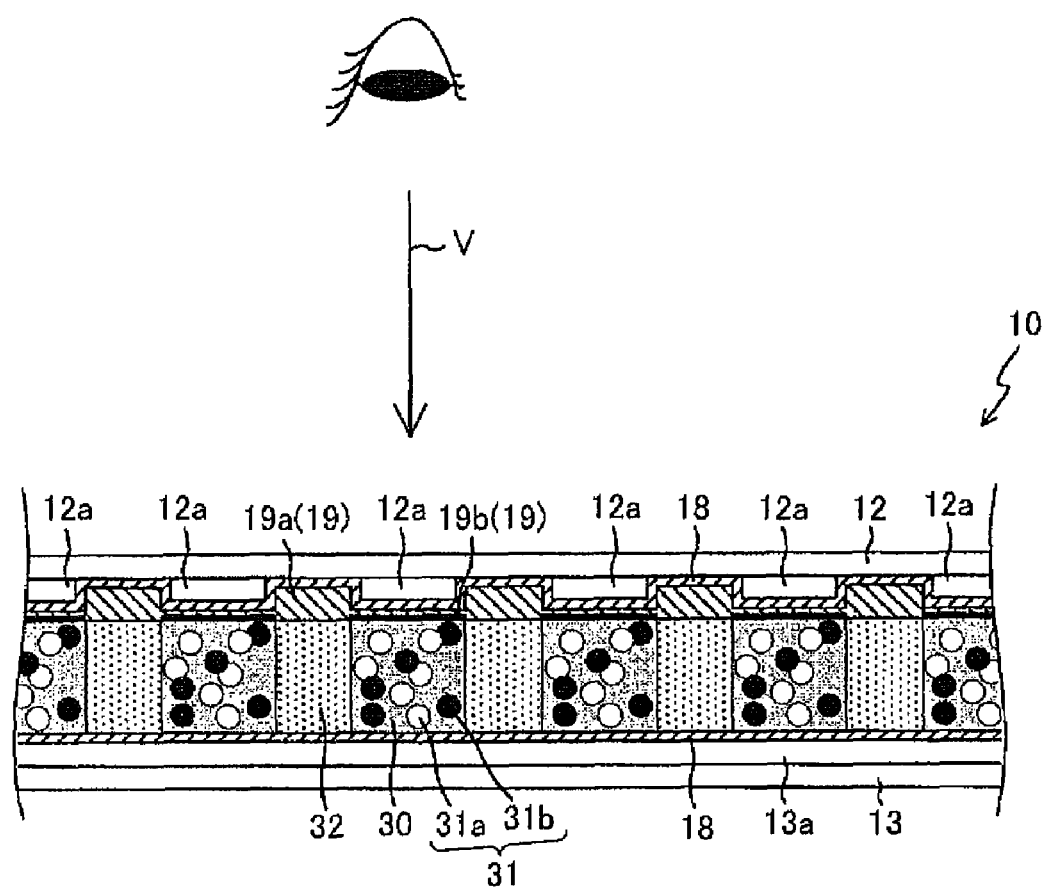

<SUBSTRATE AFTER SURFACE TREATMENT PROCESS>

<MEDIUM LAYOUT PROCESS>

<PARTITION LAYOUT PROCESS>

DISPLAY MEDIUM AND METHOD OF MANUFACTURING DISPLAY MEDIUM

CROSS-REFERENCE TO RELATED APPLICATIONS

This application is a continuation-in-part of International Patent Application No. PCT/JP2005/014941, filed Aug. 16, 2005, which claims the benefit the benefit of Japanese Patent Application Nos. 2004-289075, filed Sep. 30, 2004, and 2004-307180, filed Oct. 21, 2004, the disclosures of which are incorporated herein by reference.

BACKGROUND OF THE INVENTION

1. Field of the Invention

The present invention relates to a display medium, an electrophoretic display, and a method of manufacturing the display medium. The present invention particularly relates to a display medium capable of suppressing irregular coloring to enhance display performance and capable of achieving bright multicolor displays, an electrophoretic display device employing the display medium, and a method of manufacturing the display medium.

2. Description of Related Art

Display media using electrophoresis are well known in the art as a medium for displaying images that can be repeatedly rewritten. However, with these electrophoretic display media, charged particles (particles that migrate in the electrophoretic medium when an electric field is generated) in one pixel can transfer into neighboring pixels, resulting in uneven colors or a drop in contrast. Many of these display media have been provided with partitions between neighboring pixels for preventing the charged particles from transferring from pixel to pixel.

For example, Japanese unexamined patent application publication No. 2003-202601 proposes an image display device having partitions. The partitions are formed by applying a photosensitive paste having a photosensitive resin composition to a substrate, using a photo mask to expose only regions of the paste corresponding to the partitions in order to harden the paste, and subsequently developing and baking the paste.

There are also some display media that are wholly flexible. FIGS. 1(a) and 1(b) illustrate problems that can occur with such a flexible display medium 100 when providing the display medium 100 with solid partitions 140. FIG. 1(a) shows the display medium 100 in an unflexed state, while FIG. 1(b) shows the display medium 100 in a flexed state. The display medium 100 includes a substrate 120, a substrate 130 disposed substantially parallel to the substrate 120, a plurality of line-shaped electrodes 120a and 130a disposed in confrontation with the substrate 120 and substrate 130, respectively, in a simple matrix of orthogonal lines, the solid partitions 140 disposed between the substrate 120 and substrate 130, and an electrophoretic medium (not shown) with dispersed charged particles filling the spaces between the substrate 120 and substrate 130.

When the flexible display medium 100 provided with the solid partitions 140 as described in Japanese unexamined patent application publication No. 2003-202601 is flexed as shown in FIG. 1(b), the partitions 140 are unable to withstand the strain and break or separate at the bonded regions.

To resolve this problem, Japanese unexamined patent application publication No. 2003-15166 describes an electrophoretic display device that seals gaps between the partitions and substrates by providing a soft surface layer on the substrate on which the partitions are not formed and presses the partitions against this surface layer. With the electrophoretic display device disclosed in Japanese unexamined patent application publication No. 2003-15166, the soft surface layer prevents the partitions themselves from being deformed, thereby preventing damage to the partitions.

Electrophoretic display media capable of displaying multicolor images have also been proposed as rewritable display media. Japanese unexamined patent application publication No. 2003-108035 for example discloses a scattering reflection color display body capable of displaying color images by forming color filters in positions corresponding to electrodes disposed on the first substrate above the display medium. Japanese unexamined patent application publication No. 2000-35769 describes another display panel manufactured by injecting three types of nozzles with three different colors of microcapsules and ejecting one capsule at a time from the nozzles onto divided parts of a first electrode using an inkjet system.

SUMMARY OF THE INVENTION

However, while the electrophoretic display device disclosed in patent reference 2 can prevent damage to the partitions when the substrate is flexed, the increased number of parts and increased complexity of the manufacturing process required for providing the soft surface layer leads to an increase in manufacturing costs.

The process for providing the solid partitions is also generally complex due to the large number of steps involved. Further, once the solid partitions are provided on the substrate, it is difficult to fill all of the pixels with a uniform amount of the electrophoretic medium, resulting in uneven colors and low contrast.

In the case of a reflection display medium such as that using electrophoresis, providing separate layers of color filters as described in patent reference 3 leads to a drop in picture brightness (a darkening of the image) and a decline in color quality. Further, in the method disclosed in patent reference 4, it is difficult to align the microcapsules properly because the timing at which the microcapsules are ejected is difficult to control.

To resolve the problems described above, it is an object of the present invention to provide a display medium that suppresses an occurrence of uneven colors and a drop in contrast to achieve excellent display properties and that is capable of being manufactured according to a simple method, and to provide a method of manufacturing the display medium.

It is another object of the present invention to provide a display medium capable of being manufactured according to a simple method and capable of displaying bright multicolor images, an electrophoretic display device provided with the display medium, and a method of manufacturing the display medium.

In order to attain the above and other objects, the present invention provides a display medium including a pair of substrates disposed in spaced-apart relation and substantially parallel to each other, and an electrophoretic medium disposed between the pair of substrates and containing charged particles, whereby an electric field generated between the pair of substrates causes the charged particles contained in the electrophoretic medium to migrate for switching a display state. The display medium further includes a partitioning medium having fluidity being phase-separated from the electrophoretic medium at least at room temperature, the partitioning medium being in a phase-separated state phase-separated from the electrophoretic medium; wherein the partitioning medium is disposed between the pair of substrates as a partition to partition the electrophoretic medium.

Another aspect of the present invention provides a display medium including a pair of substrates disposed in spaced-apart relation and substantially parallel to each other, charged particles, and an electrophoretic medium disposed between the pair of substrates and containing the charged particles, whereby an electric field generated between the pair of substrates causes the charged particles contained in the electrophoretic medium to migrate and switch a display state; wherein the electrophoretic medium includes a first medium that takes on a first color, and a second medium that takes on a second color, the second medium being capable of being phase-separated from the first medium at least at room temperature, the second medium and the first medium that are phase-separated from each other forming a prescribed pattern when in a mutually phase-separated state.

Another aspect of the present invention provides an electrophoretic display device including a display medium according to claim 32; and an electric field controlling unit that independently controls an electric field generated between the first electrode and an electrode opposing the first electrode and an electric field generated between the second electrode and an electrode opposing the second electrode.

Another aspect of the present invention provides a method of manufacturing a display medium including a pair of substrates disposed in spaced-apart relation and substantially parallel to each other, and an electrophoretic medium disposed between the pair of substrates and containing charged particles, whereby an electric field generated between the pair of substrates causes the charged particles contained in the electrophoretic medium to migrate for switching a display state. The manufacturing method includes a medium layout step for disposing a mixture of the electrophoretic medium, and a partitioning medium having fluidity and phase-separated from the electrophoretic medium at least at room temperature, on a surface of at least one of the pair of substrates opposing the other substrate; and a partition forming step for disposing the partitioning medium as a partition to partition the electrophoretic medium by phase-separating the electrophoretic medium and the partitioning medium in the mixture disposed on the surface of at least one of the pair of substrates in the medium layout step.

Another aspect of the present invention provides a method of manufacturing a display medium including a pair of substrates disposed in spaced-apart relation and substantially parallel to each other, charged particles, and an electrophoretic medium disposed between the pair of substrates and containing the charged particles, whereby an electric field generated between the pair of substrates causes the charged particles contained in the electrophoretic medium to migrate for switching a display state. The manufacturing method includes a medium layout step for disposing the electrophoretic medium including a mixture of a first medium taking on a first color and a second medium taking on a second color on a surface of at least one of the pair of substrates opposing the other substrate, the second medium being capable of being phase-separated from the first medium at least at room temperature; and a medium separation step for forming a prescribed pattern with the first medium and the second medium by phase-separating the first medium and the second medium in the electrophoretic medium disposed in the medium layout step.

BRIEF DESCRIPTION OF THE DRAWINGS

The above and other objects, features and advantages of the invention will become more apparent from reading the following description of the preferred embodiments taken in connection with the accompanying drawings in which:

FIG. 3 is a conceptual cross-sectional view of the display medium.

DETAILED DESCRIPTION OF THE PREFERRED EMBODIMENTS

Figure 1A:
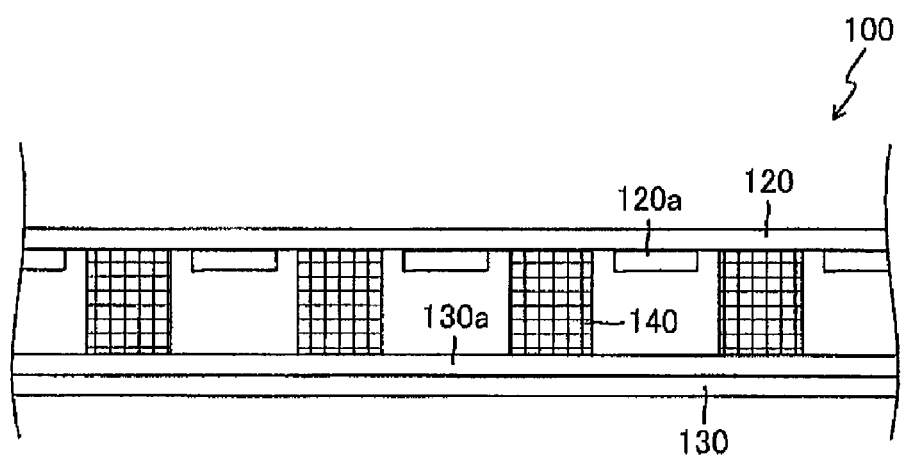
FIG. 1(a) illustrates problems that can occur in a flexible display medium when providing the display medium with solid partitions, the display medium being in an unflexed state.
Figure 1B:
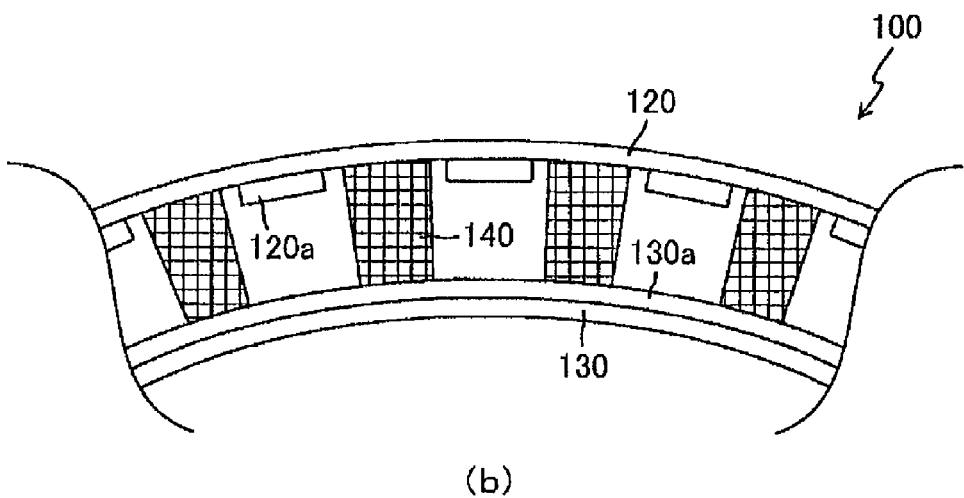
FIG. 1(b) illustrates problems that can occur in a flexible display medium when providing the display medium with solid partitions, the display medium being in a flexed state.

A display device according to preferred embodiments of the present invention will be described while referring to the accompanying drawings wherein like parts and components are designated by the same reference numerals to avoid duplicating description.

In the following description, the expressions "front", "rear", "upper", "lower", "right", and "left" are used to define the various parts when the display device is disposed in an orientation in which it is intended to be used.

Figure 2A:
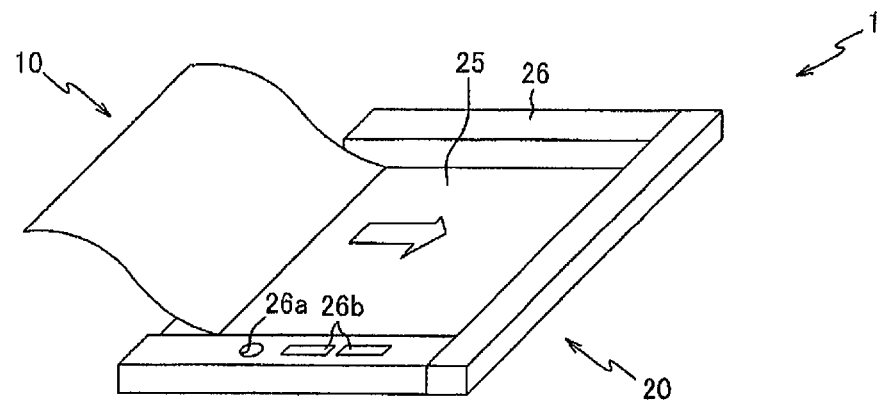
FIG. 2(a) is a perspective view of a display device for displaying images on a display medium according to a first embodiment of the present invention.
Figure 2B:
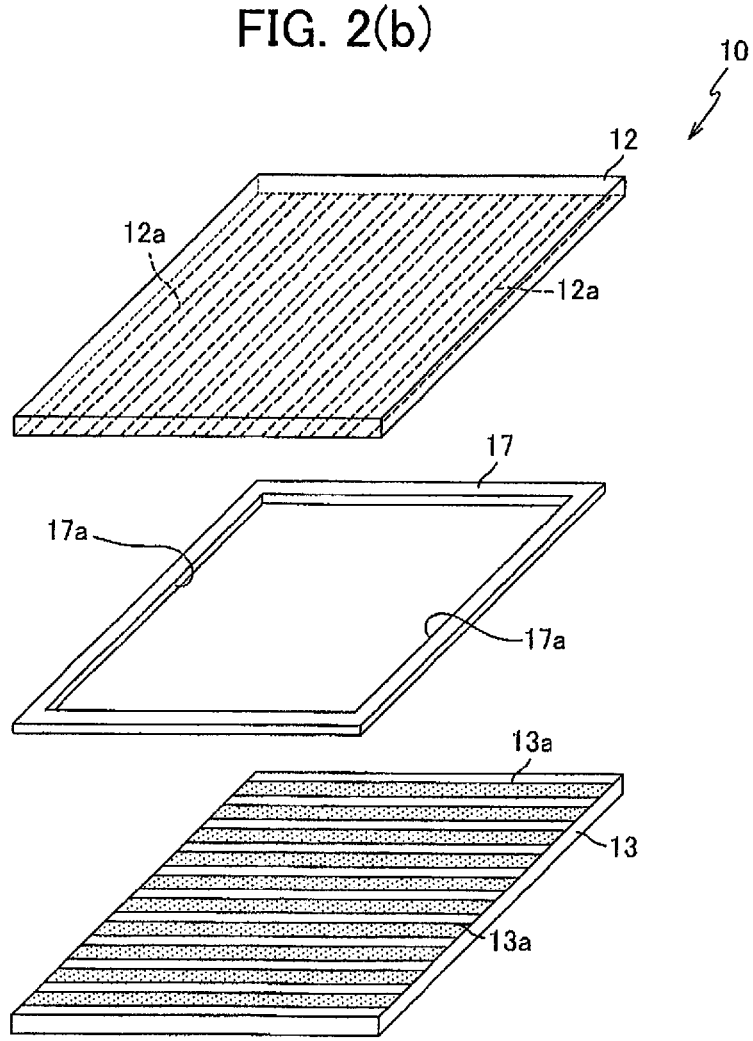
FIG. 2(b) is an exploded perspective view showing the general structure of the display medium according to the first embodiment.

Next, preferred embodiments of the present invention will be described while referring to the accompanying drawings. FIGS. 2(a) and 2(b) show a display medium 10 according to a first embodiment of the present invention. FIG. 2(a) is a perspective view of a display device 1 for displaying images on the display medium 10. FIG. 2(b) is an exploded perspective view showing the general structure of the display medium 10.

As shown in FIG. 2(a), the display device 1 is configured of the display medium 10 and a main body 20. Images can be displayed on the display medium 10 by performing prescribed operations after positioning the display medium 10 in the main body 20.

The main body 20 includes a base plate 25 that is rectangular in shape and slightly larger than the display medium 10, and a frame 26 mounted along the peripheral edges of the base plate 25. An opening is provided in the frame 26 in one section along the periphery of the base plate 25 (the left side of the base plate 25 in FIG. 2(a)). By providing this open section in the frame 26, the user can easily insert the display medium 10 into the display device 1 and retrieve the display medium 10 therefrom. The frame 26 has a built-in drive control unit (not shown) for controlling an electric signal (current, voltage, and polarity) applied to X electrodes 12a and Y electrodes 13a provided in the display medium 10 (see FIG. 2(b)).

A power switch 26a and operating buttons 26b are provided on the surface of the frame 26. A CPU (not shown) included in the drive control unit (not shown) controls the power switch 26a. When the CPU detects that the power switch 26a has been switched on, the CPU supplies power to the main body 20. The operating buttons 26b are operated by the user to display images on the display medium 10.

When the display medium 10 is inserted into the display device 1 to a prescribed position on the base plate 25, the X electrodes 12a and Y electrodes 13a of the display medium 10 (see FIG. 2(b)) are connected to the drive control unit (not shown) built into the frame 26. At this time, by operating the operating buttons 26b, the user can display a desired image on the display medium 10 through the control of the drive control unit (not shown).

As shown in FIG. 2(b), the display medium 10 includes primarily a first substrate 12, a second substrate 13, and a gap spacer 17 interposed between the first substrate 12 and second substrate 13, forming a layered structure. While this structure will be described in greater detail with reference to FIG. 3, the space between the first substrate 12 and second substrate 13 separated by the gap spacer 17 is filled with an electrophoretic medium 30 containing charged particles 31 (see FIG. 3) and a partitioning medium 32 (see FIG. 3) functioning as partitions.

Both the first substrate 12 and the second substrate 13 have a thickness of about 20 μm and are formed of a material such as glass, synthetic resin, natural resin, or paper. The first substrate 12 and second substrate 13 are preferably formed of a flexible synthetic resin material, such as polyethylene teraphthalate (PEP), polyethylene napthalate (PEN), polyphenaline sulfide (PPS), or another polyester resin; aramid; polyimide; nylon; polypropylene; or a rigid polyethylene (high density polyethylene). Of these synthetic resins, polyethylene teraphthalate, polyethylene napthalate, and polyphenaline sulfide are particularly desirable for their strength, transparency, and heat resistance, and polyethylene teraphthalate is most desirable. By using one of these flexible materials as the first substrate 12 and second substrate 13, the entire display medium 10 can be made flexible.

The X electrodes 12a and Y electrodes 13a are provided on the first substrate 12 and second substrate 13, respectively, on surfaces opposing each other in the display medium 10. The X electrodes 12a and Y electrodes 13a have an electric polarity for applying an electric field to the electrophoretic medium 30 (see FIG. 3). Both the X electrodes 12a and the Y electrodes 13a include a plurality of line-shaped electrodes that are substantially parallel to each other. The X electrodes 12a are arranged substantially orthogonal to the Y electrodes 13a in the display medium 10. Hence, the display medium 10 displays images according to a simple matrix drive system in which the X electrodes 12a and Y electrodes 13a are switched on or off.

The X electrodes 12a and Y electrodes 13a are not particularly limited to any material, provided that the material has conductivity, such as a metal, semiconductor, conducting resin, conductive coating, or conductive ink. Using one of these materials, the X electrodes 12a and Y electrodes 13a can be formed on the first substrate 12 and second substrate 13, respectively, according to one of various methods well known in the art, such as electroless plating, sputtering, vapor deposition, or an inkjet method. When the first substrate 12 and second substrate 13 are formed of a flexible synthetic resin, it is particularly easy to form the X electrodes 12a and Y electrodes 13a without damaging the substrates (the first substrate 12 and second substrate 13) according to an inkjet method using ink containing a conductive polymer, such as a conductive polythiophene polymer.

The gap spacer 17 is formed of one of the synthetic resins, natural resins, or glass, for example, suggested above as the material for the first substrate 12 and second substrate 13. The gap spacer 17 is formed with an opening in the center region and a thickness of about 20 µm.

A protective film 18 (see FIG. 3) having a resistance to fluids and a surface treatment part 19 (see FIG. 3) are provided on the surfaces of the X electrodes 12a and Y electrodes 13a formed on the first substrate 12 and second substrate 13, respectively. In order to simplify the drawing in FIG. 2(b), the protective film 18 and surface treatment part 19 have been omitted.

Next, the structure of the display medium 10 will be described in detail with reference to FIG. 3. FIG. 3 is a conceptual cross-sectional view of the display medium 10. The cross-section in FIG. 3 passes through one of the Y electrodes 13a formed on the second substrate 13 and cuts through each of the X electrodes 12a formed on the first substrate 12 substantially orthogonal thereto.

As shown in FIG. 3, the region of the display medium 10 between the first substrate 12 and the second substrate 13 is filled with the electrophoretic medium 30 and the partitioning medium 32. The electrophoretic medium 30 includes the charged particles 31 that are either positively or negatively charged. The partitioning medium 32 functions as partitions for partitioning the electrophoretic medium 30.

The electrophoretic medium 30 is arranged in regions corresponding to the pixels, while the partitioning medium 32 is arranged along partitioning lines for separating regions corresponding to each pixel from neighboring pixels, thereby delineating each pixel. "Pixels" in the display medium 10 correspond to regions centered on intersecting areas of the X electrodes 12a and Y electrodes 13a arranged in a lattice formation, wherein an electric field generated in one intersecting region of the X electrodes 12a and Y electrodes 13a independently of the other regions causes the charged particles 31 in that region to migrate independently from charged particles 31 in the other regions.

The electrophoretic medium 30 and partitioning medium 32 are mutually phase separated at least at room temperature at which the display medium 10 operates and are formed of a liquid or other fluid substance (solvent or solution) capable of maintaining this phase-separated state. When the electrophoretic medium 30 and partitioning medium 32 are phase-separated, it is preferable that the two liquids are completely separated at the boundaries. However, a "near phase-separated" state in which the two liquids mix in the boundary regions is allowable, provided that the liquids appear to be completely separated at the boundaries. Hence, the term "phase-separated" in the present specification and the scope of the claims includes a near phase-separated state and is not limited to complete separation at the boundaries of the liquids.

The electrophoretic medium 30 and partitioning medium 32 are preferably a combination of mutually insoluble solvents, a combination of solutions containing mutually insoluble solvents, or a combination of mutually insoluble solvents and solutions containing mutually insoluble solvents. Since it is particularly preferable to use a liquid with a large electrical resistance (high insulating properties) for the electrophoretic medium 30, the electrophoretic medium 30 is a solvent insoluble in water or a solution containing a solvent insoluble in water. The partitioning medium 32 is preferably water or an aqueous solution.

When using a water insoluble solvent as the electrophoretic medium 30, it is preferable that the solvent have a high electrical resistance (high insulating property) as in an aromatic hydrocarbon solvent (for example, benzene, toluene, and xylene), an aliphatic hydrocarbon solvent (for example, a normal or cyclic paraffinic hydrocarbon solvent such as hexane or cyclohexane, an isoparaffinic hydrocarbon solvent, or kerosene), a halogenated hydrocarbon solvent (for example, chloroform, trichloroethylene, dichloromethane, trichlorotrifluoroethylene, or ethyl bromide), an oily polysiloxane such as silicone oil, or a high-purity oil. For an electrophoretic medium 30, an aliphatic hydrocarbon solvent is particularly preferable. Some examples of a suitable electrophoretic medium 30 are Isopar G, H, M, and L (all manufactured by ExxonMobil Chemical), Shellsol (manufactured by Showa Shell Sekiyu), and IP Solvent 1016, 1620, 2028, 2835 (all manufactured by Idemitsu Sekiyu Kagaku). The term "water insoluble solvent" in the present specification and the scope of the claims includes any of the organic solvents mentioned above and a mixture of two or more of the organic solvents mentioned above.

If the electrophoretic medium 30 is water or an aqueous solution, it is preferable to use water with a large electrical resistance (high insulating property) with no ionic material, and particularly preferable to use distilled water or ion-exchange water.

As described above, the partitioning medium 32 is a fluid substance that can be phase-separated from the electrophoretic medium 30 at least at room temperature. The partitioning medium 32 is preferably water or an aqueous solution when using a water insoluble solvent as the electrophoretic medium 30, from the perspective of accessibility, and preferably a water insoluble solvent or a solution containing a water insoluble solvent when using water or an aqueous solution as the electrophoretic medium 30. In this case, the water insoluble solvent used for the partitioning medium 32 is preferably one of the solvents described above for the electrophoretic medium 30.

The partitioning medium 32 functions as partitioning walls for defining pixels in the display medium 10. Hence, the display medium 10 in the preferred embodiment is formed using a fluid substance for the partitioning walls. Accordingly, the partitions are unlikely to break when the display medium 10 is flexed.

The partitioning medium 32 is preferably colorless or white in color so as not to have any adverse effects on the images displayed by the display medium 10.

The charged particles 31 contained (dispersed) in the electrophoretic medium 30 include white charged particles 31a that are positively charged and black charged particles 31b that are negatively charged. For each pixel in the display medium 10, the white charged particles 31a and black charged particles 31b migrate to the first substrate 12 side or the second substrate 13 side according to the electric field generated between the X electrodes 12a and Y electrodes 13a.

More specifically, when the second substrate 13 forms an electric field that is positive relative to the X electrode 12a at a certain pixel, the negatively charged black charged particles 31b migrate to the second substrate 13 side (the Y electrode 13a side), while the white charged particles 31a migrate to the first substrate 12 side (X electrode 12a side). If the second substrate 13 is the surface on the side viewed by the user (hereinafter referred to as the "viewing surface") in this case, this pixel appears black to the user. In the following description, when the user perceives a pixel to be black, the state of that pixel will be referred to as a "displayed state."

On the other hand, when the Y electrode 13a forms an electric field that is negative relative to the X electrode 12a, the positively charged white charged particles 31a migrate to the second substrate 13 side (Y electrode 13a side), while the negatively charged black charged particles 31b migrate to the first substrate 12 side (X electrode 12a side). If the second substrate 13 is the viewing surface in this case, this pixel is perceived to be white by the user. In the following description, pixels perceived to be white by the user viewing the viewing surface are referred to as being in a "non-displayed state."

The surfaces of the charged particles 31 (white charged particles 31a and black charged particles 31b) have a greater affinity to the electrophoretic medium 30 than the partitioning medium 32. Therefore, the charged particles 31 are selectively dispersed in the electrophoretic medium 30 rather than the partitioning medium 32. By providing the charged particles 31 with such a surface, the charged particles 31 dispersed in the electrophoretic medium 30 are prevented from migrating within the partitioning medium 32 and from migrating to the electrophoretic medium 30 in other regions via the partitioning medium 32. As a result, this construction prevents uneven coloring or a drop in contrast from occurring in the display medium 10, thereby maintaining a stable image quality.

Examples of the white charged particles 31a and black charged particles 31b include pigments such as a white titanium dioxide and a black carbon black coated with a polymer, or polymer particles colored with white and black dyes.

When the electrophoretic medium 30 is a water insoluble solvent or a solution including a water insoluble solvent and the partitioning medium 32 is water or an aqueous solution, the charged particles 31 may be manufactured using a polymer with a surface exhibiting hydrophobic (lipophilic) properties, such as a polymer having a hydrophobic surface. Polymers having a hydrophobic surface include styrene resin, acrylic resin, a styrene-acrylic copolymer, and a polyester resin. Specific examples include Natoco-spacer (manufactured by Natoco), EPOCOLOR (manufactured by Nippon Shokubai), Chemisnow (manufactured by Soken Chemical & Engineering), Tospearl (manufactured by GE Toshiba Silicones), and Techpolymer (manufactured by Sekisui Plastics).

If the electrophoretic medium 30 is water or an aqueous solution and the partitioning medium 32 is a water insoluble solvent or a solution containing a water insoluble solvent, then a polymer having a hydrophobic surface is used as the charged particles 31. In this case, charged particles 31 having a hydrophilic surface can be obtained by forming a polymer having a hydrophobic surface from one of the above enumerated polymers showing more affinity to the electrophoretic medium 30 than the partitioning medium 32 and either depositing fine particles of a hydrophilic substance, such as titanium dioxide or silica, or forming a film of this hydrophilic substance on the surface of charged particles encapsulating a coloring or pigment. Alternatively, the charged particles 31 may be manufactured using a polymer with a hydrophilic surface. Some examples of polymers having a hydrophilic surface include particles obtained through dispersion polymerization of methyl methacrylate using a copolymer produced by polymerizing acrylamide and hydroxymethyl acrylate as a monomer or poly(oxyethylene) macromonomer as a reactive dispersion stabilizer, and particles obtained through the graft polymerization of a hydrophilic acrylate monomer or hydrophilic (meta)acrylate monomer on the surface of polymer particles.

As shown in FIG. 3, the protective film 18 is provided on the surfaces of the X electrodes 12a and Y electrodes 13a in the display medium 10. Since the protective film 18 prevents direct contact between the liquid electrophoretic medium 30 and the electrodes (X electrodes 12a and Y electrodes 13a), deterioration of the electrodes (X electrodes 12a and Y electrodes 13a) can be prevented. The protective film 18 is preferably a film having a fluorine-containing compound for its excellent water repellency, oil repellency, corrosion resistance, and chemical resistance.

The fluorine-containing compound should be a type that has a liquid form above a prescribed temperature, such as low-molecular-weight polytetrafluoroethylene (low-molecular-weight PTFE), low-molecular-weight polychlorotrifluoroethylene (low-molecular-weight PCTFE), low-molecular-weight tetrafluoroethylene-perfluoroalkyl vinyl ether copolymer (low-molecular-weight PFA), and low-molecular-weight tetrafluoroethylene-hexafluoropropylene copolymer (low-molecular-weight FEP).

The protective film 18 is formed according to a process (hereinafter referred to as the "protective film forming process") in which the above-mentioned fluorine-containing compound is heated to at least the prescribed temperature in order to convert the compound into liquid form, coated uniformly over the surface of the substrate (first substrate 12 or second substrate 13) on which the electrodes (X electrodes 12a or Y electrodes 13a) are provided, and subsequently dried.

In the protective film forming process, the fluorine-containing compound may be applied to the substrate (first substrate 12 or second substrate 13) using a dipping, sol-gel, or spray method, for example. The fluorine-containing compound used to form the protective film 18 may also be a compound that can be applied by dissolving or dispersing in a solvent. In this case, the same protective film forming process described above can be implemented using a liquid having the dissolved or dispersed fluorine-containing compound.

As shown in FIG. 3, the surface treatment part 19 is provided on the first substrate 12, which serves as the viewing surface, and is a layer that contacts the electrophoretic medium 30 and partitioning medium 32. The surface treatment part 19 includes a first surface treatment layer 19a and a second surface treatment layer 19b.

As shown in FIG. 3, the exposed regions of the first surface treatment layer 19a and second surface treatment layer 19b correspond to the positions at which the electrophoretic medium 30 and partitioning medium 32 are provided. While this will be described in greater detail with reference to FIGS. 7(a)-7(c), the second surface treatment layer 19b is provided in regions corresponding to pixels, while the first surface treatment layer 19a is disposed in positions at which the partitions delineating the pixels will be formed.

The second surface treatment layer 19b is a layer at least the surface of which shows greater affinity to the electrophoretic medium 30 than the partitioning medium 32, while the first surface treatment layer 19a is a layer at least the surface of which shows greater affinity to the partitioning medium 32 than the electrophoretic medium 30. For example, if the electrophoretic medium 30 is a water insoluble solvent or a solution containing such a solvent, and the partitioning medium 32 is water or an aqueous solution, then the second surface treatment layer 19b is a surface exhibiting a hydrophobic (or lipophilic) property, while the first surface treatment layer 19a has a surface exhibiting a hydrophilic property.

Hence, when the electrophoretic medium 30 and partitioning medium 32 are phase-separated, the most stable state of energy is achieved by disposing the electrophoretic medium 30, having a greater affinity to the second surface treatment layer 19b than the partitioning medium 32, in contact with the second surface treatment layer 19b and the partitioning medium 32, having a greater affinity to the first surface treatment layer 19a than the electrophoretic medium 30, in contact with the first surface treatment layer 19a. Therefore, providing the second surface treatment layer 19b and the first surface treatment layer 19a simplifies the selective disposal of the phase-separated electrophoretic medium 30 and partitioning medium 32 in contact with the second surface treatment layer 19b and first surface treatment layer 19a.

The surface treatment part 19 (first surface treatment layer 19a and second surface treatment layer 19b) is preferably provided on the first substrate 12 side, which is the viewing surface. By providing the first surface treatment layer 19a and second surface treatment layer 19b on the first substrate 12 side, the pixel regions formed by the electrophoretic medium 30 and the partitions formed by the partitioning medium 32 can be clearly defined. The surface treatment part 19 should be transparent when provided on the first substrate 12 side so as not to obstruct the display.

Further, even if the phase-separated electrophoretic medium 30 and partitioning medium 32 laid out in prescribed positions between the first substrate 12 and second substrate 13 become mixed due to external factors (such as when pressure is applied to the first substrate 12 and second substrate 13), the electrophoretic medium 30 and partitioning medium 32 subsequently return to the respective second surface treatment layer 19b or first surface treatment layer 19a.

Next, a method of forming the surface treatment part 19 (hereinafter referred to as the "surface treatment process") will be described with reference to FIGS. 4(a)-4(e) and FIGS. 5(a)-5(e). FIGS. 4(a)-4(e) illustrate a first example of the surface treatment process, while FIGS. 5(a)-5(e) illustrate a second example of the surface treatment process.

The first example illustrated in FIGS. 4(a)-4(e) is a surface treatment process that uses a hydrophilic polymer that can be selectively converted to a hydrophobic property in regions exposed by an infrared laser (hereinafter referred to as a heat-sensitive phase-conversion hydrophilic polymer). This method is well known in the art and is commonly used in the printing industry (for example, in the SP Plateless DOP technology developed by Creo).

Figure 4A:
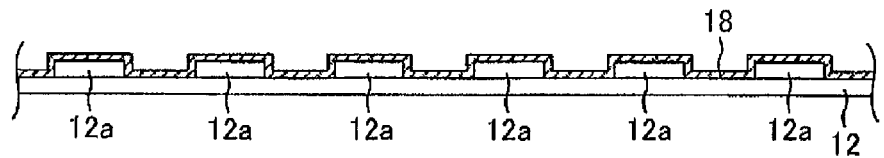
FIG. 4(a) illustrates a first example of a surface treatment process in a state prior to forming a first surface treatment layer.
Figure 4B:
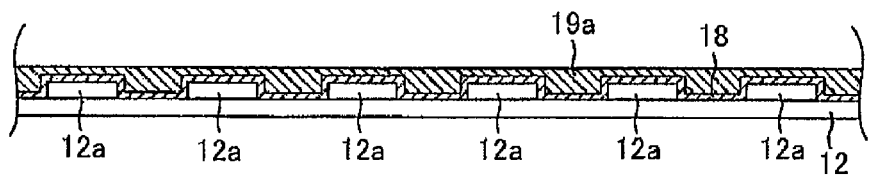
FIG. 4(b) illustrates the first example of the surface treatment process, showing a first substrate when the first surface treatment layer is provided on a protective film.

FIG. 4(a) shows the state of the substrate after performing the protective film forming process and prior to forming the first surface treatment layer 19a. FIG. 4(b) shows the first substrate 12 when the first surface treatment layer 19a is provided on the protective film 18. The first surface treatment layer 19a is formed by applying the heat-sensitive phase-conversion hydrophilic polymer to the protective film 18 by spraying or the like.

Figure 4C:
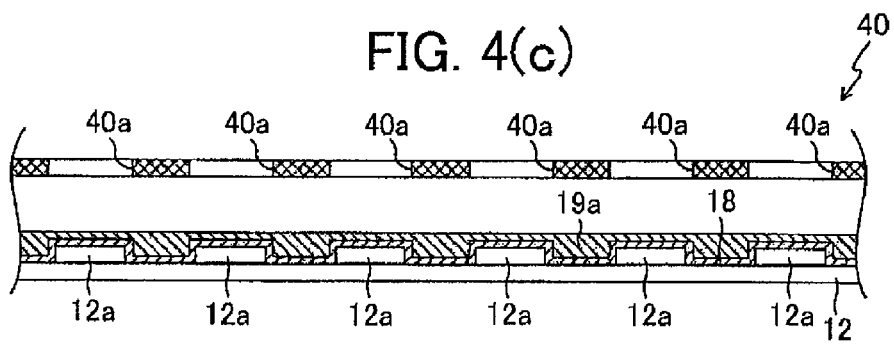
FIG. 4(c) illustrates the first example of the surface treatment process when a metal mask is provided.
Figure 4D:
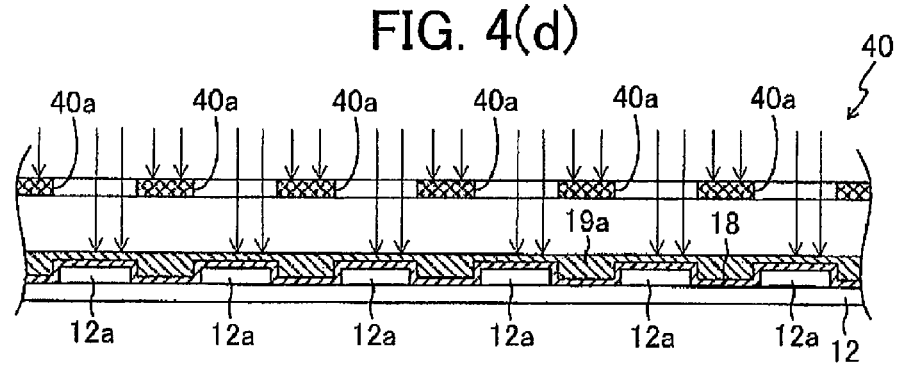
FIG. 4(d) illustrates the first example of the surface treatment process when irradiating an infrared laser.
Figure 4E:
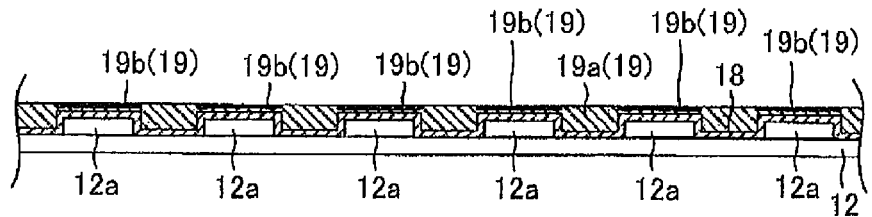
FIG. 4(e) illustrates the first example of the surface treatment process when a second surface treatment layer has been formed.

FIGS. 4(c)-4(e) illustrate how the second surface treatment layer 19b is formed by irradiating an infrared laser. Once the first surface treatment layer 19a is provided on the protective film 18, a metal mask 40 is disposed above the first surface treatment layer 19a, as shown in FIG. 4(c). The metal mask 40 has a plurality of openings 40a arranged at the positions of the pixels and shaped to correspond to the pixels (for example, having a substantially polygonal shape, such as rectangular or hexagonal). the metal mask 40 is arranged so that the openings 40a are in desired positions for forming the second surface treatment layer 19b, that is, corresponding to the pixels.

Next, as shown in FIG. 4(d), an infrared laser is irradiated onto the first surface treatment layer 19a through the metal mask 40 in the direction of the arrows. Portions of the first surface treatment layer 19a exposed to the infrared laser through the openings 40a change in phase to become the hydrophobic second surface treatment layer 19b, as shown in FIG. 4(e). As described above, the openings 40a are formed in the metal mask 40 at positions corresponding to pixels. Therefore, exposure by the infrared laser forms the second surface treatment layer 19b in regions corresponding to pixels on the X electrode 12a, while the first surface treatment layer 19a remains at positions for providing partitions to separate the pixels.

The second example illustrated in FIGS. 5(a)-5(e) is a surface treatment process in which the hydrophilic surface layer is ablated through irradiation of an infrared laser to expose the underlying hydrophobic layer. This method is also well known in the art and is commonly used in the printing industry (for example, REALwet developed by Presstek).

Figure 5A:
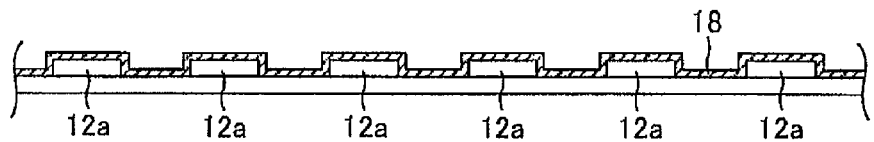
FIG. 5(a) illustrates a second example of the surface treatment process prior to forming a layered body for ablation.
Figure 5B:
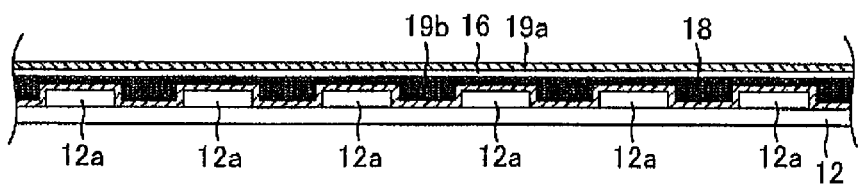
FIG. 5(b) illustrates the second example of the surface treatment process, showing the first substrate when the layered body for ablation is provided on the protective film.

FIG. 5(a) shows the state of the substrate after performing the protective film forming process and prior to providing the layered body for ablation. FIG. 5(b) shows the first substrate 12 when the layered body for ablation is disposed on the protective film 18. The layered body for ablation has three layers, including the first surface treatment layer 19a formed of a hydrophilic polymer, the second surface treatment layer 19b formed of a hydrophobic film, and a metal peeling layer 16 disposed between the first surface treatment layer 19a and second surface treatment layer 19b. As shown in FIG. 5(b), the layered body for ablation is arranged with the second surface treatment layer 19b on top of the protective film 18.

Figure 5C:
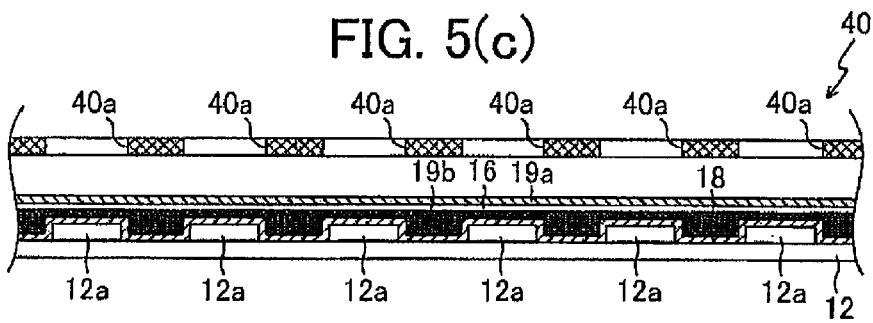
FIG. 5(c) illustrates the second example of the surface treatment process when the metal mask is provided.
Figure 5D:
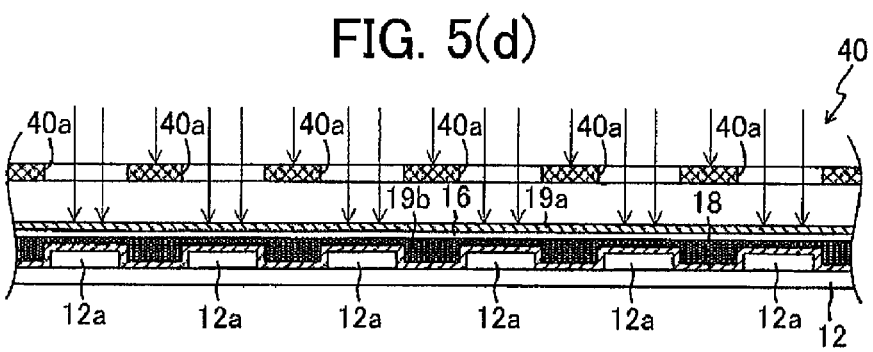
FIG. 5(d) illustrates the second example of the surface treatment process when irradiating an infrared laser.
Figure 5E:
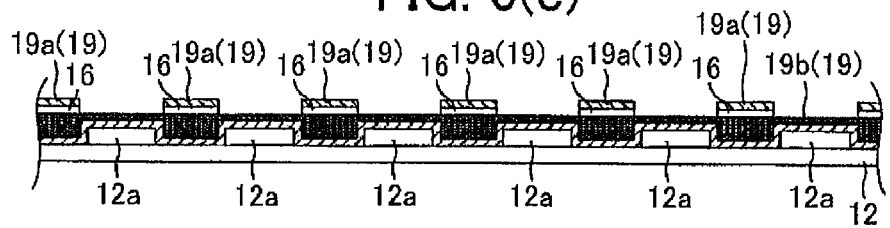
FIG. 5(e) illustrates the second example of the surface treatment process when the second surface treatment layer has been exposed.

FIGS. 5(c)-5(e) illustrate how the surface treatment part 19 is formed by the irradiation of an infrared laser. Once the layered body for ablation is arranged on the protective film 18, as shown in FIG. 5(c), the metal mask 40 is disposed above the first surface treatment layer 19a and has a plurality of the openings 40a corresponding to the positions of the pixels and a shape corresponding to the pixels (for example, a polygonal shape such as a substantially rectangular shape or a substantially hexagonal shape). At this time, the metal mask 40 is disposed so that the openings 40a are arranged in desirable positions for forming the second surface treatment layer 19b, that is, in positions corresponding to the pixels.

Next, as shown in FIG. 5(d), an infrared laser is irradiated onto the layered body for ablation via the metal mask 40 in the direction of the arrows. Portions of the first surface treatment layer 19a and the metal peeling layer 16 in the layered body that are exposed to the irradiated infrared laser through the openings 40a are ablated, exposing the hydrophobic second surface treatment layer 19b, as shown in FIG. 5(e). As described above, the openings 40a of the metal mask 40 are arranged at positions corresponding to pixels. Hence, when exposed by the infrared laser, the second surface treatment layer 19b is formed in regions of the X electrode 12a corresponding to the pixels, while the first surface treatment layer 19a remains in positions at which partitions are to be provided for delineating the pixels.

According to the method shown in FIGS. 4(a)-4(e) or FIGS. 5(a)-5(e) described above, the pattern (shape and layout) of the first surface treatment layer 19a and second surface treatment layer 19b can be easily modified as needed by changing the shape and positions of the openings 40a formed in the metal mask 40. Hence, the partitions of the electrophoretic medium 30 formed by the partitioning medium 32 can be freely modified in shape and size.

The method of providing the surface treatment part 19 is not limited to the methods described above. Various methods may be used to form the surface treatment part 19. For example, a roller or the like can be used to apply a polymer having stronger affinity to the electrophoretic medium 30 than the partitioning medium 32 at positions corresponding to the pixels, while a roller or the like can be used to apply a polymer having a greater affinity to the partitioning medium 32 than the electrophoretic medium 30 at positions for providing partitions to delineate the pixels. Alternatively, a polymer having a stronger affinity to the electrophoretic medium 30 than the partitioning medium 32 may be sprayed over the entire first substrate 12, while a roller or the like is subsequently used to apply a polymer having a stronger affinity to the partitioning medium 32 than the electrophoretic medium 30 at positions for providing partitions to delineate the pixels.

Figure 6:
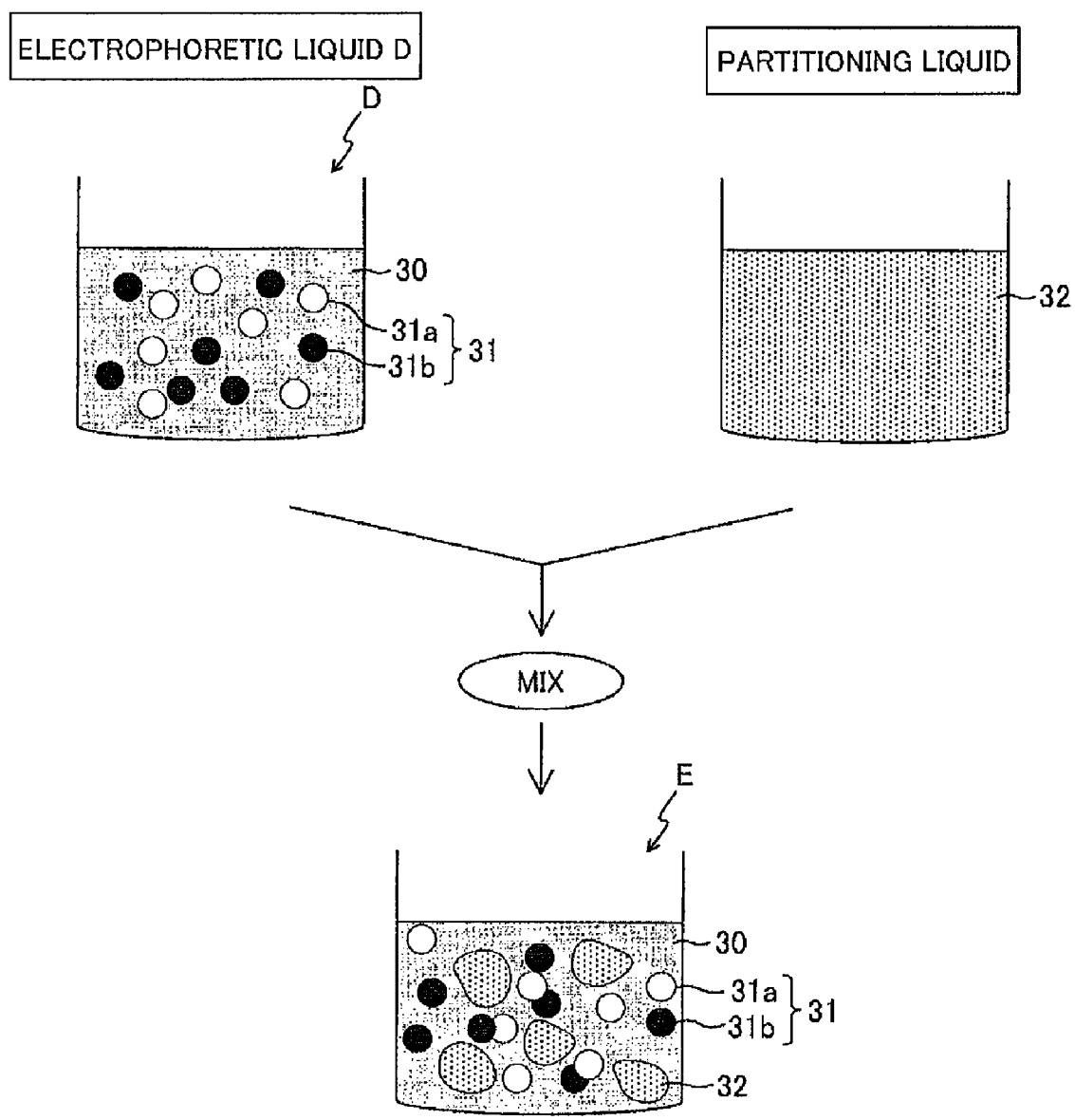
FIG. 6 conceptually illustrates the preparation of a mixture of an electrophoretic medium containing charged particles and a partitioning medium.
Figure 7A:
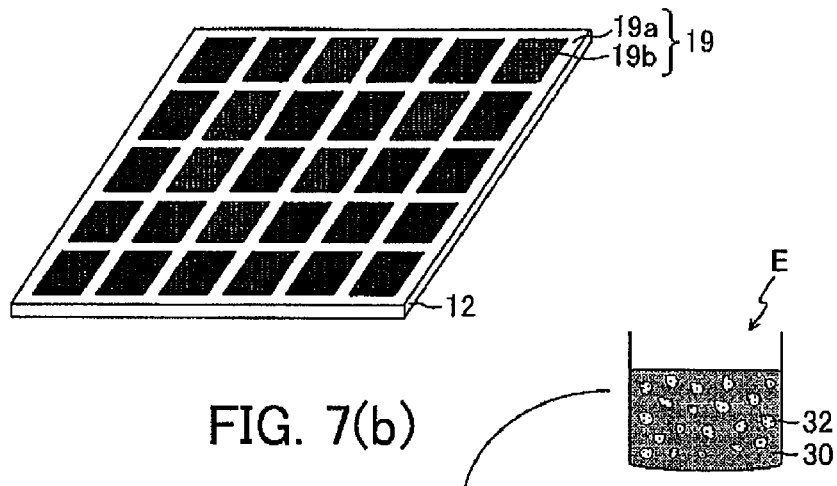
FIG. 7(a) illustrates a process of forming partitions with the partitioning medium, showing the substrate after the surface treatment process.
Figure 7B:
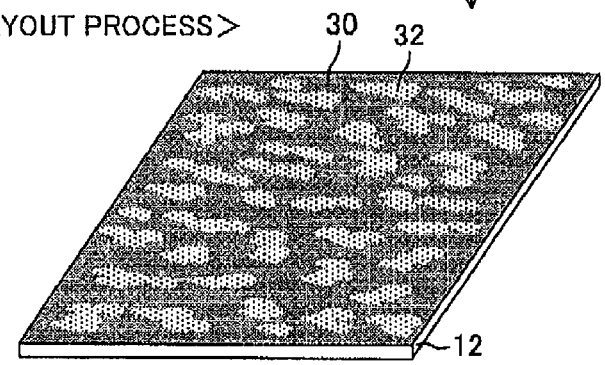
FIG. 7(b) illustrates the process of forming partitions with the partitioning medium, showing a medium layout process.
Figure 7C:
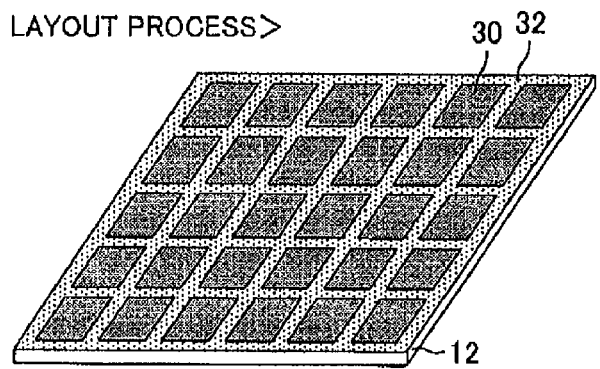
FIG. 7(c) illustrates the process of forming partitions with the partitioning medium, showing a partition layout process.

Next, a method of arranging the electrophoretic medium 30 and partitioning medium 32 on the display medium 10 will be described with reference to FIG. 6 and FIGS. 7(a)-7(c). FIG. 6 conceptually illustrates the preparation of a mixture of the electrophoretic medium 30 containing the charged particles 31 and the partitioning medium 32. FIGS. 7(a)-7(c) illustrate a process of forming partitions with the partitioning medium 32.

In order to prepare a mixture of the electrophoretic medium 30 and partitioning medium 32 according to the preferred embodiment, first a dispersion liquid is prepared by dispersing the charged particles 31 (white charged particles 31a and black charged particles 31b) having a surface exhibiting a stronger affinity to the electrophoretic medium 30 than the partitioning medium 32 in the electrophoretic medium 30 (hereinafter, this dispersion liquid is referred to as the "electrophoretic liquid D"). Next, the electrophoretic liquid D is mixed with the partitioning medium 32 and is stirred well to produce an emulsion in which the partitioning medium 32 is dispersed in the electrophoretic medium 30 (hereinafter referred to as the "emulsion E"), as shown in the bottom drawing of FIG. 6.

As is described later with reference to FIGS. 7(a)-7(c), this emulsion E is disposed on the first substrate 12 having the surface treatment part 19. While FIG. 6 indicates the emulsion E as an emulsion in which the partitioning medium 32 is dispersed in the electrophoretic medium 30, the emulsion E may also be an emulsion in which the electrophoretic medium 30 is dispersed in the partitioning medium 32.

As shown in FIG. 7(b), the emulsion E prepared as described above is applied according to the doctor blade method on the first substrate 12 over which the gap spacer 17 is laminated after performing the surface treatment process (hereinafter referred to as the "medium layout process"). In FIG. 7(b), the charged particles 31 dispersed in the emulsion E and the gap spacer 17 laminated on the first substrate 12 have been omitted for simplification.

After performing the medium layout process, as shown in FIG. 7(c), the emulsion E coated on the first substrate 12 separates spontaneously to produce the partitioning medium 32 as partitions at prescribed positions (hereinafter referred to as the "partition layout process"). In the partition layout process, partitions (the partitioning medium 32) are selectively laid out based on the affinity of the surface treatment part 19 formed on the first substrate 12 in the surface treatment process (FIG. 7(a)) with the partitioning medium 32 or electrophoretic medium 30. Specifically, by phase-separating the emulsion E, the electrophoretic medium 30 is selectively laid out on the second surface treatment layer 19b, which has a stronger affinity to the electrophoretic medium 30 than the partitioning medium 32, while the partitioning medium 32 is selectively laid out on the first surface treatment layer 19a, which has a stronger affinity to the partitioning medium 32 than the electrophoretic medium 30.

When the emulsion E is phase-separated into the electrophoretic medium 30 and partitioning medium 32, the charged particles 31, whose surfaces have a stronger affinity to the electrophoretic medium 30 than the partitioning medium 32, become selectively dispersed within the electrophoretic medium 30.

After completing the medium layout process, the display medium 10 is completed by placing the second substrate 13 over the gap spacer 17 without introducing air bubbles and sealing the periphery.

The medium layout process shown in FIG. 7(b) is an example of a method for applying the emulsion E to one of a pair of substrates (the first substrate 12). However, another method uses a dispenser or the like to inject the emulsion E into pre-assembled cells formed by the first substrate 12, gap spacer 17, and second substrate 13. According to the partition layout process, the emulsion E injected into the cells selectively forms partitions (the partitioning medium 32) on the first surface treatment layer 19a according to the pattern of the surface treatment part 19 formed on the first substrate 12.

Hence, the method of the preferred embodiment uses the spontaneous phase-separation of the electrophoretic medium 30 and partitioning medium 32 and the selective layout of the electrophoretic medium 30 and partitioning medium 32 according to a difference of affinity with the first surface treatment layer 19a or second surface treatment layer 19b. Therefore, this method facilitates the production of the display medium 10, while eliminating the complexities of steps for forming solid partitions and the difficulty of injecting the electrophoretic medium after forming the solid partitions.

In the display medium 10 of the first embodiment described above, the electrophoretic medium 30 and partitioning medium 32 can be phase-separated at least at room temperature. When in this phase-separated state, the electrophoretic medium 30 is partitioned by regions occupied by the partitioning medium 32. Hence, the partitioning medium 32, which is a fluid substance, functions as the partitions. Therefore, damage to the partitions can be suppressed when the flexible display medium 10 is bent. Further, since the partitions are formed using phase-separation of the electrophoretic medium 30 and partitioning medium 32, the display medium 10 can be manufactured according to a simple method.

In this case, the second surface treatment layer 19b having a stronger affinity to the electrophoretic medium 30 than the partitioning medium 32 is provided on the surface of the first substrate 12 contacting the electrophoretic medium 30 at positions for arranging the electrophoretic medium 30, while the first surface treatment layer 19a having a greater affinity to the partitioning medium 32 than the electrophoretic medium 30 is arranged on the surface of the first substrate 12 contacting the partitioning medium 32 in a shape corresponding to partitions. In this way, the electrophoretic medium 30 and partitioning medium 32 can be selectively arranged in positions at which the second surface treatment layer 19b and first surface treatment layer 19a are provided.

Further, since the charged particles 31 have a surface showing a greater affinity to the electrophoretic medium 30 than the partitioning medium 32, charged particles 31 dispersed in an area of the electrophoretic medium 30 partitioned by the partitioning medium 32 are prevented from migrating into the partitioning medium 32 and from passing through the partitioning medium 32 and migrating into other areas of the electrophoretic medium 30. Therefore, this display medium 10 can prevent the occurrence of uneven coloring and a drop in contrast, thereby maintaining a stable image quality.

Figure 8:
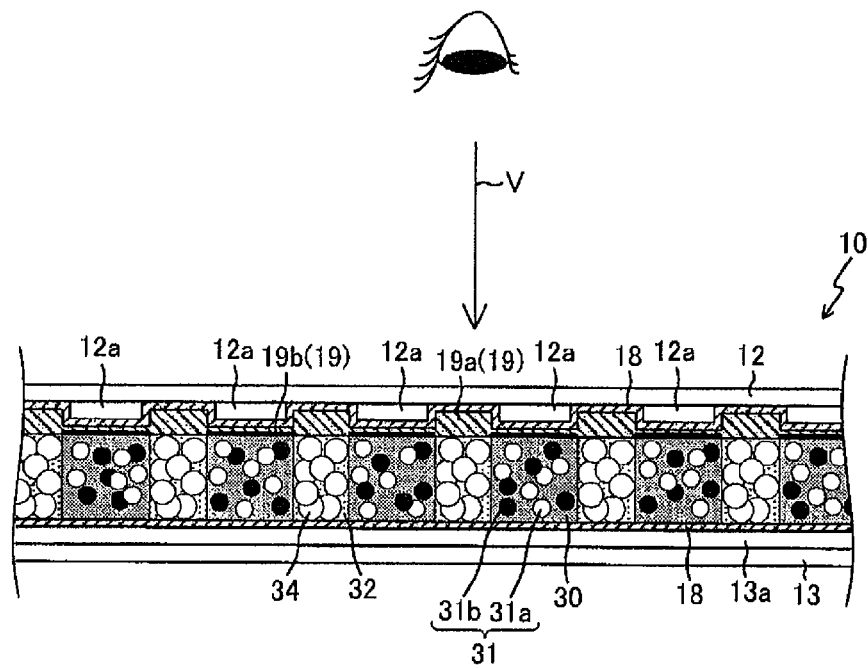
FIG. 8 is a conceptual cross-sectional view of the display medium according to a second embodiment.

Next, the display medium 10 according to a second embodiment will be described with reference to FIG. 8, wherein like parts and components are designated with the same reference numerals to avoid duplicating description.

In the display medium 10 of the first embodiment, partitions are formed only with the partitioning medium 32, which is a liquid material. However, the display medium 10 according to the second embodiment has partitions formed of the partitioning medium 32 containing spacer particles 34, as shown in FIG. 8.

The presence of the spacer particles 34 maintains at least a prescribed distance between the pair of substrates (the first substrate 12 and second substrate 13) in the display medium 10. Since this arrangement can reliably prevent excessive strain in the surface of the first substrate 12 or second substrate 13 when a force is applied thereto, it is possible to reliably prevent damage to the first substrate 12 or second substrate 13. This is particularly useful for reliably preventing the first substrate 12 and second substrate 13 from contacting each other due to slackness of the substrates when the first substrate 12 and second substrate 13 are flexible, thereby reliably preventing a drop in image quality and damage to the display medium.

The spacer particles 34 are formed at a prescribed diameter of an inorganic material such as glass or a polymer material. The surface of the spacer particles 34 preferably exhibits a greater affinity to the partitioning medium 32 than the electrophoretic medium 30 or is treated so as to exhibit such affinity. The spacer particles 34 are preferably obtained by depositing one of the hydrophilic substances enumerated in the description of the charged particles 31 on the surface of polymer particles or coating the polymer particles with the hydrophilic substance, for example. Using spacer particles 34 whose surfaces show a greater affinity to the partitioning medium 32 than the electrophoretic medium 30 facilitates the selective arrangement of the spacer particles 34 in the partitioning medium 32.

Next, the display medium 10 according to a third embodiment will be described with reference to FIG. 9, wherein like parts and components are designated with the same reference numerals to avoid duplicating description.

Figure 9:
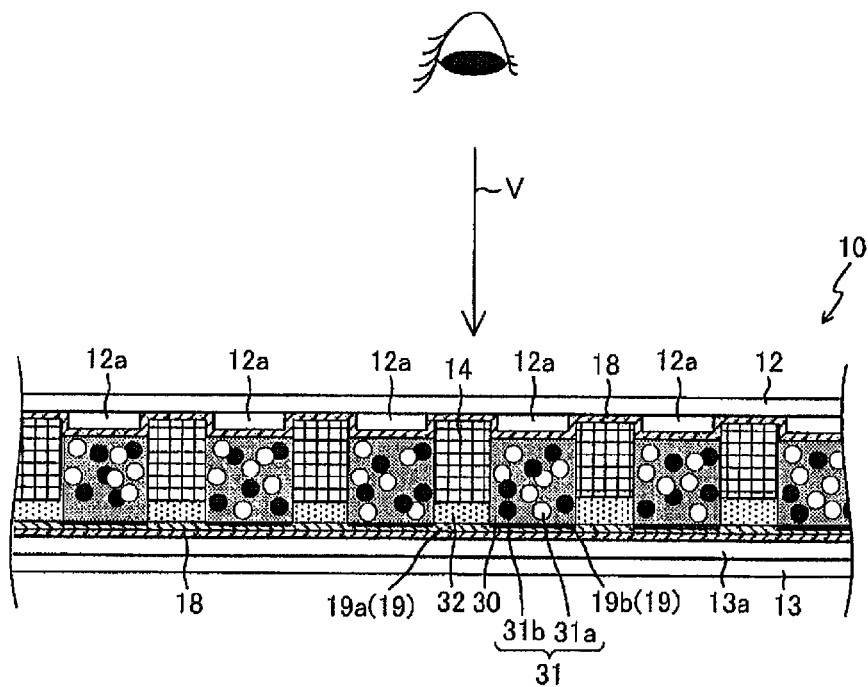
FIG. 9 is a conceptual cross-sectional view of the display medium according to a third embodiment.

As shown in FIG. 9, the display medium 10 according to the third embodiment has fixed partitions 14 that are fixed to the first substrate 12 on one end and separated from the second substrate 13. The fixed partitions 14 configured by fixing a plate formed of glass, resin, or the like to the first substrate 12, the plate being thinner than the distance between the first substrate 12 and second substrate 13 and having through-holes of a shape corresponding to the pixels (a substantially rectangular, hexagonal, or other polygonal shape) or are formed on the first substrate 12 according to a method well known in the art using photosensitive resin and a photomask. Since the fixed partitions 14 clearly partition the electrophoretic medium 30, it is preferable that the fixed partitions 14 be fixed to the first substrate 12 side, which is the viewing surface.

While the fixed partitions 14 can maintain at least a prescribed distance between the pair of electrodes (first substrate 12 and second substrate 13), the fixed partitions 14 are separated from the second substrate 13, decreasing the likelihood of the partitions becoming damaged when the flexible display medium 10 is bent.

Further, as shown in FIG. 9, the spaces between the fixed partitions 14 and the second substrate 13 are filled with the partitioning medium 32. The partitioning medium 32 prevents charged particles 31 dispersed in one area of the electrophoretic medium 30 from migrating to other areas of the electrophoretic medium 30. Hence, despite achieving both the same function as the conventional fixed partitions having both ends fixed to the substrates, the fixed partitions 14 and second substrate 13 are separated from each other as described above, reducing the likelihood of damage to the partitions when the display medium 10 is flexed.

As shown in FIG. 9, the second surface treatment layer 19b in the display medium 10 of the third embodiment is provided on the second substrate 13 separated from the fixed partitions 14 at positions corresponding to the X electrodes 12a, while the first surface treatment layer 19a is provided on the second substrate 13 at positions corresponding to the opposing surface of the fixed partitions 14. The first surface treatment layer 19a and second surface treatment layer 19b function to selectively arrange the partitioning medium 32 in the spaces between the fixed partitions 14 and second substrate 13.

As shown in FIG. 9, when providing the surface treatment part 19 on the second substrate 13 side, the medium layout process is preferably accomplished using a method of injecting the emulsion E with a dispenser or the like into pre-assembled cells configured by the first substrate 12, gap spacer 17, and second substrate 13. Here, the separation between the fixed partitions 14 and the second substrate 13 facilitates injection of the emulsion E so that the electrophoretic liquid D is uniformly arranged in each pixel.

While not shown in the drawing, rather than providing the surface treatment part 19 on the second substrate 13 side, it is also possible to provide the second surface treatment layer 19b on the protective film 18 of the first substrate 12 at positions corresponding to the X electrodes 12a and to provide the first surface treatment layer 19a on the surface of the fixed partitions 14 opposing the second substrate 13. In this case, the second surface treatment layer 19b can be formed according to one of the methods described above, such as the method using a heat-sensitive phase-conversion hydrophilic polymer or the method using a roller or the like to apply a polymer having a greater affinity to the electrophoretic medium 30 than the partitioning medium 32, while the first surface treatment layer 19a can be formed by applying a polymeric solution having a greater affinity to the partitioning medium 32 than the electrophoretic medium 30 (for example, polyvinyl alcohol solution when the partitioning medium 32 is water or an aqueous solution).

Next, the display medium 10 according to a fourth embodiment will be described with reference to FIG. 2 and FIGS. 10 through 15, wherein like parts and components are designated with the same reference numerals to avoid duplicating description.

The display medium 10 according to the fourth embodiment is similar to the display medium 10 of the first embodiment shown in the overall perspective view and exploded view of FIG. 2. Unlike the description of the first embodiment, the X electrodes 12a and Y electrodes 13a may be configured of inorganic transparent conductors, and the gap spacer 17 may be configured of a ceramic material.

Figure 10:
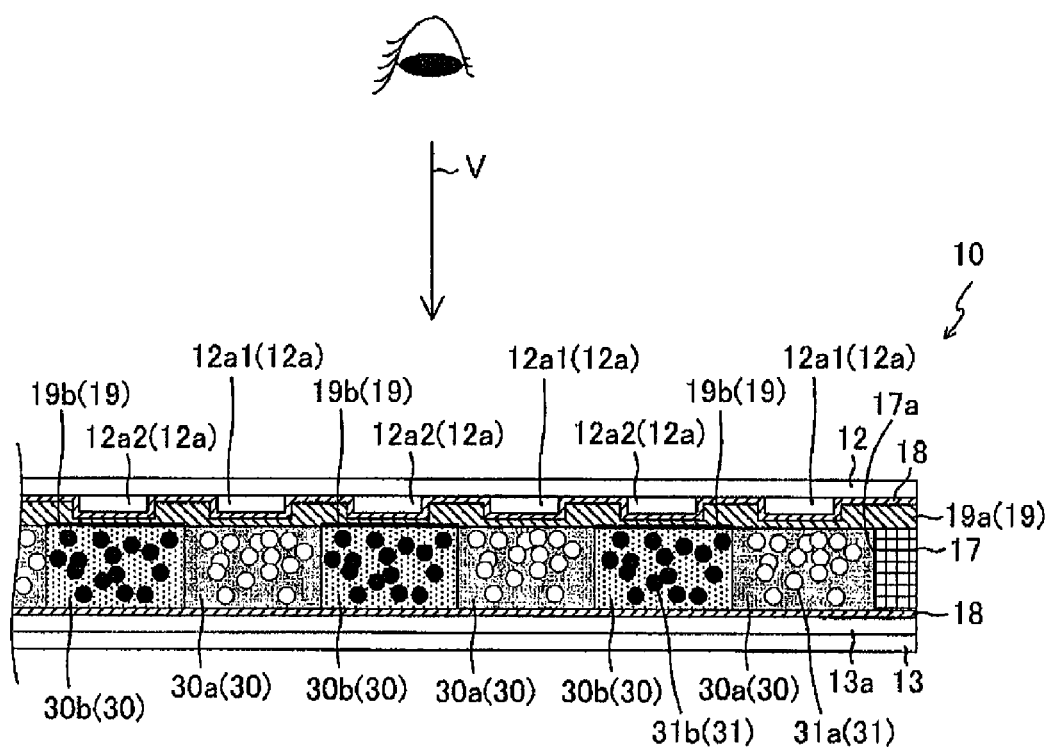
FIG. 10 is a conceptual cross-sectional view of the display medium according to a fourth embodiment.

As shown in FIG. 10, the X electrodes 12a are configured of a plurality of line-shaped XA electrodes 12a1 and XB electrodes 12a2 arranged alternately. The XA electrodes 12a1 and XB electrodes 12a2 form pairs with opposing Y electrodes 13a for generating an electric field between the first substrate 12 and second substrate 13. While this will be described in greater detail with reference to FIG. 1S, a control unit 70 (see FIG. 15) built into the main body 20 performs control for applying voltages of different drive waveforms to the XA electrodes 12a1 and XB electrodes 12a2, thereby generating different electric fields between the XA electrodes 12a1 and the Y electrode 13a and between the XB electrodes 12a2 and the Y electrode 13a.

As will be described later, different types of media (a first medium 30*a* and a second medium 30*b* constituting the electrophoretic medium 30) are respectively positioned corresponding to the positions of the XA electrodes 12*a*1 and XB electrodes 12*a*2. Hence, by producing different electric fields between the XA electrodes 12*a*1 and the Y electrode 13*a* and between the XB electrodes 12*a*2 and the Y electrode 13*a*, it is possible to effect a uniform behavior (response) of charged particles (the white charged particles 31*a* and black charged particles 31*b* constituting the charged particle 31) dispersed in the different media (the first medium 30*a* and second medium 30*b*).

As shown in FIG. 10, the space between the first substrate 12 and second substrate 13 in the display medium 10 is filled with the electrophoretic medium 30 containing positive or negative charged particles 31. The electrophoretic medium 30 is configured of the phase-separated first medium 30*a* and second medium 30*b*. As shown in FIG. 10, the first medium 30*a* and second medium 30*b* form lines centered on each of the plurality of line-shaped X electrodes 12*a*. The first medium 30*a* and second medium 30*b* are arranged in alternate lines (stripes). More specifically, the first medium 30*a* is arranged at positions corresponding to the XA electrodes 12*a*1, while the second medium 30*b* is arranged at positions corresponding to the XB electrodes 12*a*2.

The first medium 30*a* and second medium 30*b* constituting the electrophoretic medium 30 are liquids (solvents or solutions) that are at least phase-separated from each other at room temperature, the temperature at which the display medium 10 is operated, and that can maintain this phase-separated state. When the first medium 30*a* and second medium 30*b* are phase-separated, it is preferable that both liquids are completely separated at the boundaries. However, a "near phase-separated" state in which the two liquids mix in the boundary regions is allowed, provided that the liquids appear to be completely separated at the boundaries.

The first medium 30*a* and second medium 30*b* are a combination of mutually insoluble solvents, a combination of solutions containing mutually insoluble solvents, or a combination of mutually insoluble solvents and solutions containing mutually insoluble solvents. In this combination, the first medium 30*a* is preferably water or an aqueous solution, while the second medium 30*b* is preferably a water insoluble solvent or a solution containing a water insoluble solvent.

When using water or an aqueous solution as the first medium 30*a*, it is preferable to use water with a large electrical resistance (high insulating property) with no ionic material, and particularly preferable to use distilled water or ion-exchange water.

When using a water insoluble solvent as the second medium 30*b*, it is preferable that the solvent have a high electrical resistance (high insulating property) as in an aromatic hydrocarbon solvent (for example, benzene, toluene, and xylene), an aliphatic hydrocarbon solvent (for example, a normal or cyclic paraffinic hydrocarbon solvent such as hexane or cyclohexane, an isoparaffinic hydrocarbon solvent, or kerosene), a halogenated hydrocarbon solvent (for example, chloroform, trichloroethylene, dichloromethane, trichlorotrifluoroethylene, or ethyl bromide), an oily polysiloxane such as silicone oil, or a high-purity oil. For the second medium 30*b*, an aliphatic hydrocarbon solvent is particularly preferable. Some examples of a suitable second medium 30*b* are Isopar G, H, M, and L (all manufactured by ExxonMobil Chemical), Shellsol (manufactured by Showa Shell Sekiyu), and IP Solvent 1016, 1620, 2028, 2835 (all manufactured by Idemitsu Sekiyu Kagaku). The term "water insoluble solvent" in the present specification and the scope of the claims includes any of the organic solvents mentioned above and a mixture of two or more of the organic solvents mentioned above.

In the preferred embodiment, the first medium 30*a* and second medium 30*b* are given different colors (for example, red and blue). the colored first medium 30*a* and second medium 30*b* can be prepared by dissolving suitable pigments that are soluble in the first medium 30*a* and second medium 30*b*.

When the charged particles 31 (white charged particles 31*a*) dispersed in the first medium 30*a* migrate to the opposite surface side from the surface viewed by the user (hereinafter referred to as the "viewing surface"), the user perceives the color of the first medium 30*a* (blue, for example). Similarly, when the charged particles 31 (black charged particles 31*b*) dispersed in the second medium 30*b* migrate to the opposite side from the viewing surface, the user perceives the color of the second medium 30*b* (red, for example). In the following description, it will be assumed that the user views the display medium 10 from the perspective indicated by the arrow V. In other words, the first substrate 12 will be the viewing surface.

Hence, the coloring in the first medium 30*a* and second medium 30*b* of the display medium 10 function as color filters, enabling the display medium 10 of the preferred embodiment to display multiple colors. Further, since a multicolor display is achieved using the colors of the first medium 30*a* and second medium 30*b*, even electrophoretic type reflection display media can achieve brighter displays with more vivid coloration than displays having separate color filters provided on the viewing surface side.

The charged particle 31 is configured of first particles 31*a* dispersed in the first medium 30*a* and second particles 31*b* dispersed in the second medium 30*b*, both of which particles are positively (or negatively) charged and are white or light in color.

The surface of the second particles 31*b* has a stronger affinity to the second medium 30*b* than the first medium 30*a*. Hence, the second particles 31*b* are selectively dispersed in the second medium 30*b* rather than the first medium 30*a*. Since the second particles 31*b* selectively dispersed in the second medium 30*b* are restrained from mixing in the first medium 30*a*, there is less likelihood of a bias occurring in the charged particles 31 dispersed in the electrophoretic medium 30, thereby maintaining a stable image quality.

When the first medium 30*a* is water or an aqueous solution and the second medium 30*b* is a water insoluble solvent or a solution containing a water insoluble solvent, the second particles 31*b* may be polymeric particles with a surface exhibiting hydrophobic (lipophilic) properties rather than hydrophilic properties, such as polymeric particles configured of polymers having a hydrophobic surface. Specific examples of polymers having a hydrophobic surface include the materials mentioned in the first embodiment.

On the other hand, the first particles 31*a* have a surface exhibiting a greater affinity to the first medium 30*a* than the second medium 30*b*. Therefore, the first particles 31*a* are selectively dispersed in the first medium 30*a* rather than the second medium 30*b*. Since the first particles 31*a* selectively dispersed in the first medium 30*a* are restrained from mixing in the second medium 30*b*, a bias in the charged particles 31 dispersed in the electrophoretic medium 30 is less likely to occur, thereby maintaining a stable image quality.

If the first medium 30*a* is water or an aqueous solution and the second medium 30*b* is a water insoluble solvent or a solution containing a water insoluble solvent, then particles having a hydrophilic surface rather than a hydrophobic surface are used as the first particles 31*a*. For example, the second particles 31b may be particles formed by depositing fine particles of a hydrophilic substance, such as titanium dioxide or silica, or forming a film of this hydrophilic substance on the surface of a resin having one of the hydrophobic surfaces enumerated above, or of polymeric particles configured of polymers having a hydrophilic surface. Specific examples of polymers having a hydrophilic surface include the materials mentioned in the first embodiment.

The first particles 31a and second particles 31b migrate to the first substrate 12 side or the second substrate 13 side according to the electric field generated between the X electrodes 12a (XA electrodes 12a1 and XB electrodes 12a2) and the Y electrodes 13a. Here, regions in which the first particles 31a and second particles 31b migrate independently according to electric fields independently generated between single intersecting X electrodes 12a and Y electrodes 13a in the lattice-shaped arrangement will be referred to as the "smallest particle migration regions."

More specifically, when an electric field is formed in one of the smallest particle migration regions such that the potential of the X electrode 12a is positive relative to the potential of the Y electrode 13a, then the positively charged particles 31 (first particles 31a or second particles 31b) migrate toward the second substrate 13 side (the Y electrode 13a side). In this case, the user perceives the color of the second substrate 13 disposed in this smallest particle migration region. Specifically, if the electrophoretic medium 30 arranged in the smallest particle migration region in which the charged particles 31 migrate to the second substrate 13 side is the blue-colored first medium 30a, the user perceives the color blue. However, if the electrophoretic medium 30 in this smallest particle migration region is the red-colored second medium 30b, then the user perceives the color red. In the preferred embodiment, the state of the smallest particle migration region when the user viewing the viewing surface perceives the color of the electrophoretic medium 30 is referred to as the "displayed state."

However, when an electric field is generated in one of the smallest particle migration regions such that the potential of the X electrode 12a is negative relative to the potential of the Y electrode 13a, then the positively charged particles 31 (first particles 31a or second particles 31b) migrate to the first substrate 12 side (X electrode 12a side). In this case, the user perceives the white or light color of the charged particles 31. Here, the state of the smallest particle migration region when the user viewing the viewing surface perceives white is referred to as the "non-displayed state."

The opposite occurs when the charged particles 31 are negatively charged. Specifically, the smallest particle migration region is in the non-displayed state when an electric field is generated in that region such that the X electrode 12a is positive relative to the Y electrode 13a and is in the displayed state when an electric field is generated in that region such that the X electrode 12a is negative relative to the Y electrode 13a.

As described above, the colored first medium 30a and second medium 30b function as colored filters in the display medium 10. Hence, if each set of neighboring smallest particle migration regions for the first medium 30a and second medium 30b configures a single pixel, the subtractive color composition of two colors for one pixel can be controlled by controlling the migration of the charged particles 31 (first particles 31a and second particles 31b) to achieve a multi-color display on the display medium 10. Here, a single pixel may include at least one of each of the smallest particle migration regions for the first medium 30a and the second medium 30b or a plurality of these smallest particle migration regions.

As shown in FIG. 10, the protective film 18 is provided on the surfaces of the X electrodes 12a and Y electrodes 13a. Since the protective film 18 prevents direct contact between the liquid electrophoretic medium 30 and the electrodes (X electrodes 12a and Y electrodes 13a), deterioration of the electrodes (X electrodes 12a and Y electrodes 13a) can be prevented. The protective film 18 is preferably a film having a fluorine-containing compound for its excellent water repellency, oil repellency, corrosion resistance, and chemical resistance.

Here, the fluorine-containing compound may be one of the materials described in the first embodiment, for example. The method of forming the protective film 18 may be one of the methods described in the first embodiment, for example.

As shown in FIG. 10, the surface treatment part 19 is provided on the first substrate 12, which serves as the viewing surface, and is a layer that contacts the electrophoretic medium 30. The surface treatment part 19 includes the first surface treatment layer 19a and second surface treatment layer 19b.

As shown in FIG. 10, the exposed regions of the first surface treatment layer 19a and second surface treatment layer 19b correspond to the positions at which the first medium 30a and second medium 30b are provided. While not shown in the drawings, the exposed regions of the first surface treatment layer 19a and second surface treatment layer 19b are formed in stripes along the line-shaped XA electrodes 12a1 and XB electrodes 12a2, respectively.

The first surface treatment layer 19a is a layer in which at least the surface contacting the electrophoretic medium 30 exhibits greater affinity to the first medium 30a than the second medium 30b, while the second surface treatment layer 19b is a layer in which at least the surface contacting the electrophoretic medium 30 exhibits greater affinity to the second medium 30b than the first medium 30a. For example, if the first medium 30a is water or an aqueous solution and the second medium 30b is a water insoluble solvent or a solution containing such a solvent, then the first surface treatment layer 19a is a layer having a hydrophilic surface, while the second surface treatment layer 19b is a layer having a hydrophobic (or lipophilic) surface.

Hence, when the first medium 30a and second medium 30b are phase-separated, the most stable state of energy is achieved by disposing the first medium 30a, having greater affinity to the first surface treatment layer 19a than the second medium 30b, on the first surface treatment layer 19a and disposing the second medium 30b, having greater affinity to the second surface treatment layer 19b than the first medium 30a, on the second surface treatment layer 19b. Therefore, providing the first surface treatment layer 19a and the second surface treatment layer 19b simplifies the selective disposal of the phase-separated first medium 30a and second medium 30b on the first surface treatment layer 19a and second surface treatment layer 19b, respectively. Further, even if the phase-separated first medium 30a and second medium 30b arranged at prescribed positions between the first substrate 12 and second substrate 13 become mixed due to external factors (such as when pressure is applied to the first substrate 12 and second substrate 13), the first medium 30a and second medium 30b subsequently return to the respective first surface treatment layer 19a or second surface treatment layer 19b.

Here, the surface treatment part 19 (first surface treatment layer 19a and second surface treatment layer 19b) is preferably provided on the first substrate 12 side, which is the viewing surface in the preferred embodiment. By providing the first surface treatment layer 19a and second surface treatment layer 19b on the first substrate 12 side, it is possible to clearly define the first medium 30a and second medium 30b. Further, the surface treatment part 19 should be transparent when provided on the first substrate 12 side so as not to obstruct the display.

Next, a method of forming the surface treatment part 19 (hereinafter referred to as the "surface treatment process") will be described with reference to FIGS. 11(a)-11(e) and FIGS. 12(a)-12(e). FIGS. 11(a)-11(e) illustrate a first example of the surface treatment process, while FIGS. 12(a)-12(e) illustrate a second example of the surface treatment process.

The first example illustrated in FIGS. 11(a)-11(e) is a surface treatment process that uses a hydrophilic polymer that can be selectively converted to a hydrophobic property in regions exposed by an infrared laser (hereinafter referred to as a "heat-sensitive phase-conversion hydrophilic polymer"). This method is identical to the first example of the surface treatment process in the first embodiment.

Figure 11A:
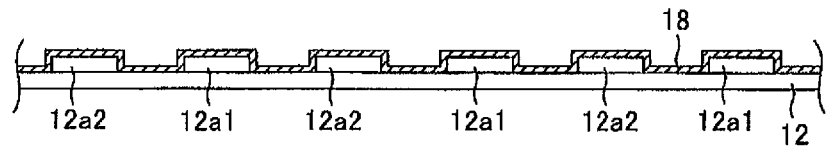
FIG. 11(a) illustrates a first example of a surface treatment process in a state prior to forming a first surface treatment layer.
Figure 11B:
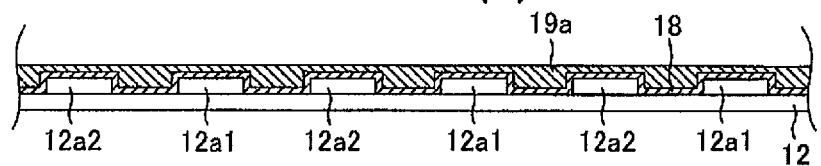
FIG. 11(b) illustrates the first example of the surface treatment process, showing a first substrate when the first surface treatment layer is provided on a protective film.

FIG. 11(a) shows the state of the substrate after performing the protective film forming process and prior to forming the first surface treatment layer 19a. FIG. 11(b) shows the first substrate 12 when the first surface treatment layer 19a is provided on the protective film 18. The first surface treatment layer 19a is formed by applying the heat-sensitive phase-conversion hydrophilic polymer to the protective film 18 by spraying or the like.

Figure 11C:
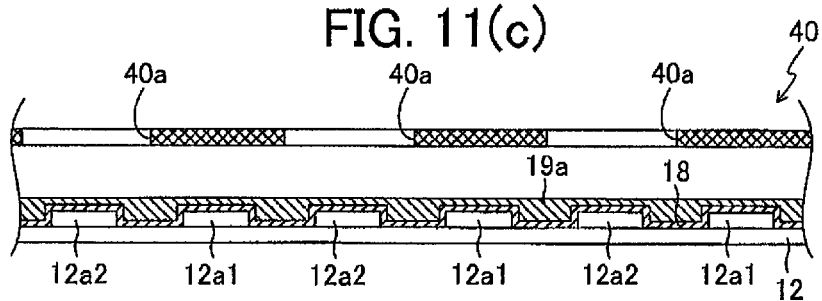
FIG. 11(c) illustrates the first example of the surface treatment process when a metal mask is provided.
Figure 11D:
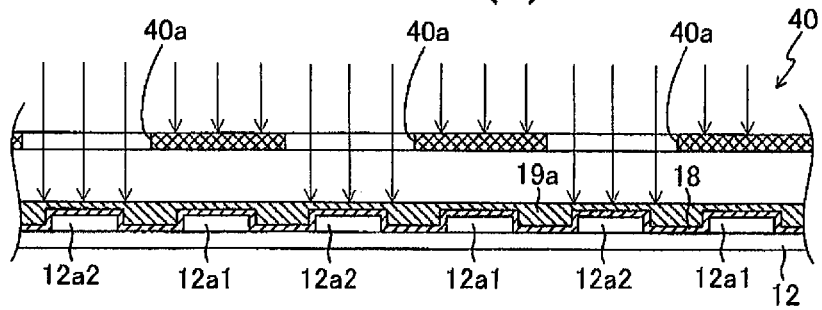
FIG. 11(d) illustrates the first example of the surface treatment process when irradiating an infrared laser.
Figure 11E:
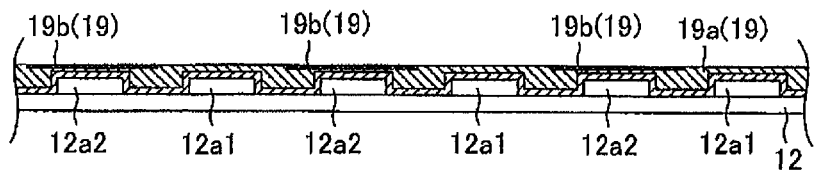
FIG. 11(e) illustrates the first example of the surface treatment process when a second surface treatment layer has been formed.

FIGS. 11(c)-11(e) illustrate how the second surface treatment layer 19b is formed by irradiating an infrared laser. Once the first surface treatment layer 19a is provided on the protective film 18, the metal mask 40 is disposed above the first surface treatment layer 19a, as shown in FIG. 11(c). The metal mask 40 has a plurality of the openings 40a having a substantially rectangular shape with a prescribed width. The metal mask 40 is arranged so that the openings 40a are in desired positions for forming the second surface treatment layer 19b and, more specifically, so that the longitudinal dimension of the openings 40a is substantially parallel to the XB electrodes 12a2 and the width dimension is substantially centered on the width of the XB electrodes 12a2.

Next, as shown in FIG. 11(d), an infrared laser is irradiated on the first surface treatment layer 19a through the metal mask 40 in the direction of the arrows. As shown in FIG. 11(e), the hydrophobic second surface treatment layer 19b is formed at regions on the first surface treatment layer 19a exposed by the infrared laser through the metal mask 40. As described above, the openings 40a of the metal mask 40 are substantially parallel to the XB electrodes 12a2 in the longitudinal direction and substantially centered on the XB electrodes 12a2 in the width direction. Therefore, when irradiated by the infrared laser, the surface of the surface treatment part 19 (exposed surface) is formed as alternating stripes including the second surface treatment layer 19b, which includes lines of a prescribed width centered on the XB electrodes 12a2, and the exposed parts first surface treatment layer 19a, which includes lines of a prescribed width centered on the XA electrodes 12a1.

The second example illustrated in FIGS. 12(a)-12(e) is a surface treatment process in which the hydrophilic surface layer of a layered body for ablation is ablated through irradiation of an infrared laser to expose the underlying hydrophobic layer. This method is identical to the second example of the surface treatment process in the first embodiment.

Figure 12A:
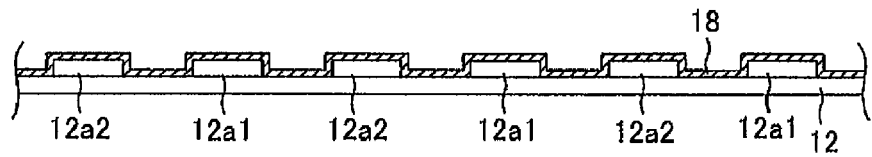
FIG. 12(a) illustrates a second example of the surface treatment process prior to forming a layered body for ablation.
Figure 12B:
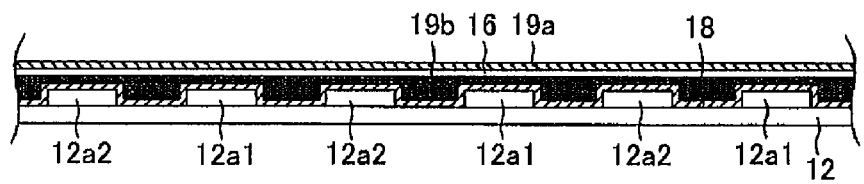
FIG. 12(b) illustrates the second example of the surface treatment process, showing the first substrate when the layered body for ablation is provided on the protective film.

FIG. 12(a) shows the state of the substrate after performing the protective film forming process and prior to forming the layered body for ablation. FIG. 12(b) shows the first substrate 12 when the layered body for ablation is disposed on the protective film 18. The layered body for ablation has three layers, including the first surface treatment layer 19a formed of a hydrophilic polymer, the second surface treatment layer 19b formed of a hydrophobic film, and the metal peeling layer 16 disposed between the first surface treatment layer 19a and the second surface treatment layer 19b. As shown in FIG. 12(b), the layered body for ablation is arranged with the second surface treatment layer 19b on top of the protective film 18.

Figure 12C:
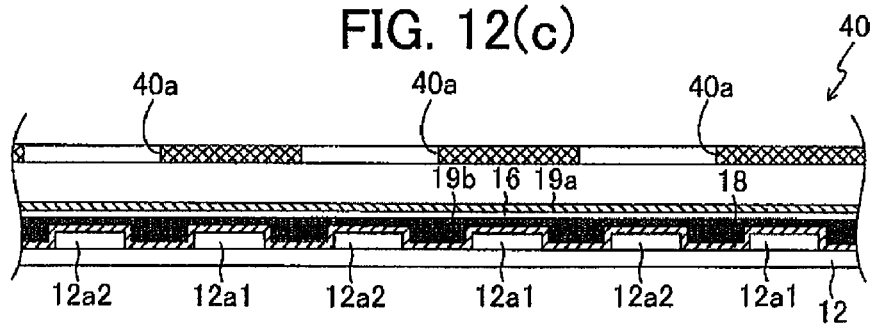
FIG. 12(c) illustrates the second example of the surface treatment process when the metal mask is provided.
Figure 12D:
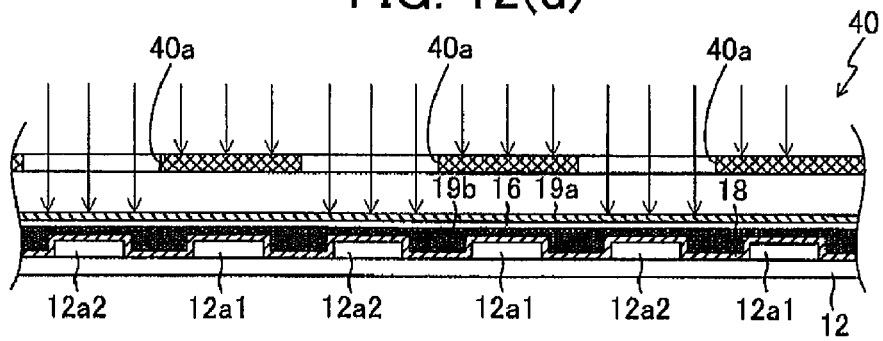
FIG. 12(d) illustrates the second example of the surface treatment process when irradiating an infrared laser.
Figure 12E:
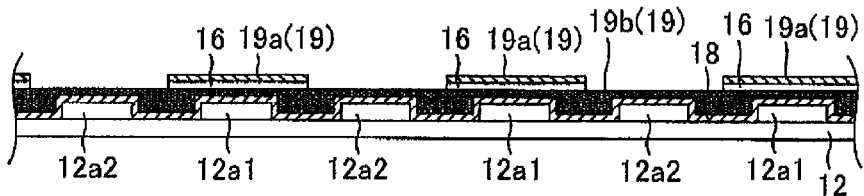
FIG. 12(e) illustrates the second example of the surface treatment process when the second surface treatment layer has been exposed.

FIGS. 12(c)-12(e) illustrate how the surface treatment part 19 is formed by the irradiation of an infrared laser. Once the layered body for ablation is arranged on the protective film 18, as shown in FIG. 12(c), the metal mask 40 is disposed above the first surface treatment layer 19a and has a plurality of the openings 40a having a substantially rectangular shape with a prescribed width. At this time, the metal mask 40 is disposed so that the openings 40a are arranged in desirable positions for forming the second surface treatment layer 19b. Specifically, the openings 40a are positioned so that the longitudinal dimension is substantially parallel to the XB electrodes 12a2 and the width dimension is substantially centered on the width of the XB electrodes 12a2.

Next, as shown in FIG. 12(d), an infrared laser is irradiated onto the layered body for ablation via the metal mask 40 in the direction of the arrows. Portions of the first surface treatment layer 19a and the metal peeling layer 16 in the layered body that are exposed to the irradiated infrared laser through the openings 40a are ablated, exposing the hydrophobic second surface treatment layer 19b, as shown in FIG. 12(e). As described above, the openings 40a of the metal mask 40 are arranged to be substantially parallel to the XB electrodes 12a2 in the longitudinal direction and substantially centered on the XB electrodes 12a2 in the width direction. Hence, when irradiated by the infrared laser, the surface of the surface treatment part 19 (exposed surface) is formed in alternating stripes of the first surface treatment layer 19a, which has lines of a prescribed width centered on the XA electrodes 12a1, and the exposed second surface treatment layer 19b, which has lines of a prescribed width centered on the XB electrodes 12a2.

According to the method shown in FIGS. 11(a)-11(e) or FIGS. 12(a)-12(e) described above, the pattern (shape and layout) of the first surface treatment layer 19a and second surface treatment layer 19b can be easily modified as needed by changing the shape and positions of the openings 40a formed in the metal mask 40. For example, the substantially rectangular first surface treatment layer 19a and second surface treatment layer 19b can be laid out in a checkered pattern.

The method of providing the surface treatment part 19 is not limited to the methods described above. Various methods may be used to form the surface treatment part 19. For example, a roller or the like can be used to apply a polymer having a stronger affinity to the first medium 30a than the second medium 30b in lines centered on the XA electrodes 12a1, while a roller or the like can be used to apply a polymer having a greater affinity to the second medium 30b than the first medium 30a in lines centered on the XB electrodes 12a2.

Figure 13:
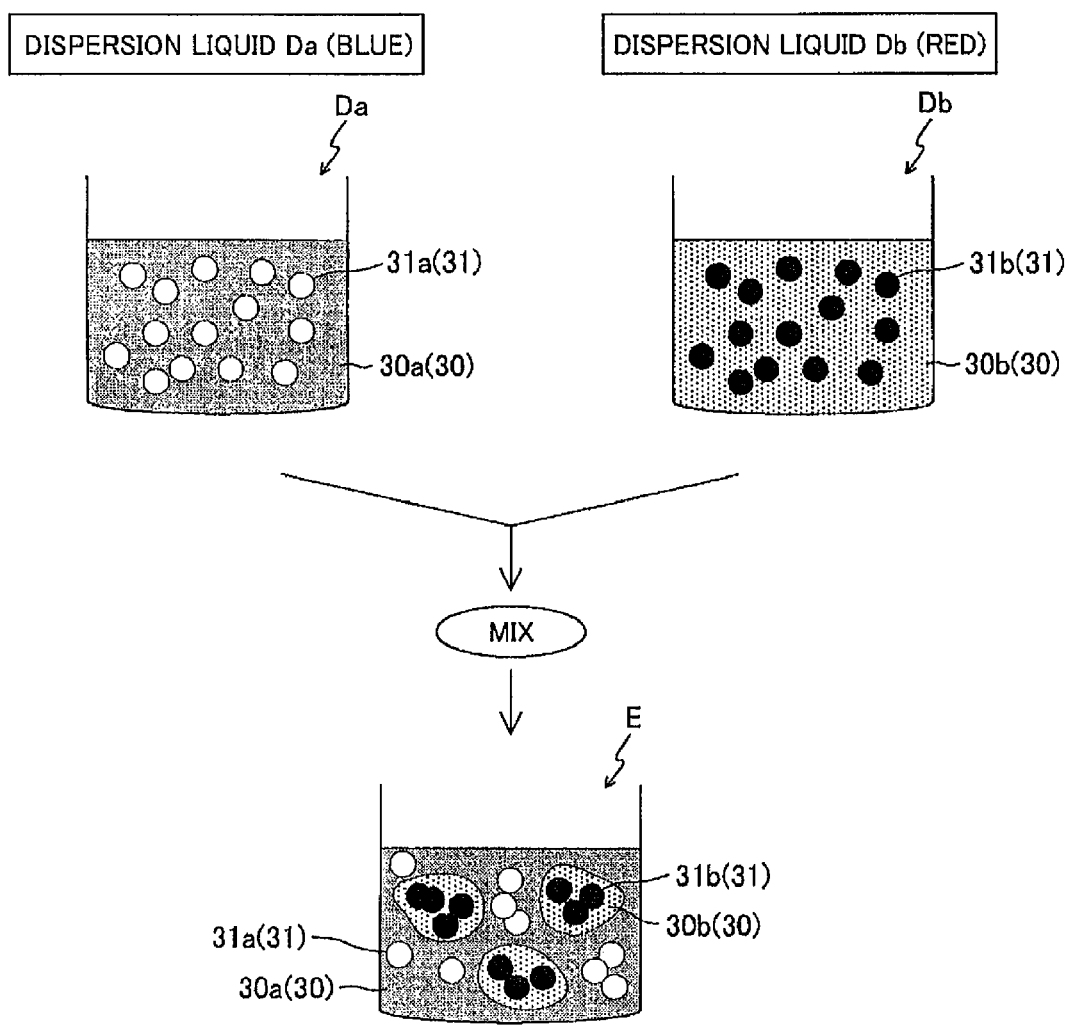
FIG. 13 conceptually illustrates the preparation of an electrophoretic medium containing charged particles.
Figure 14A:
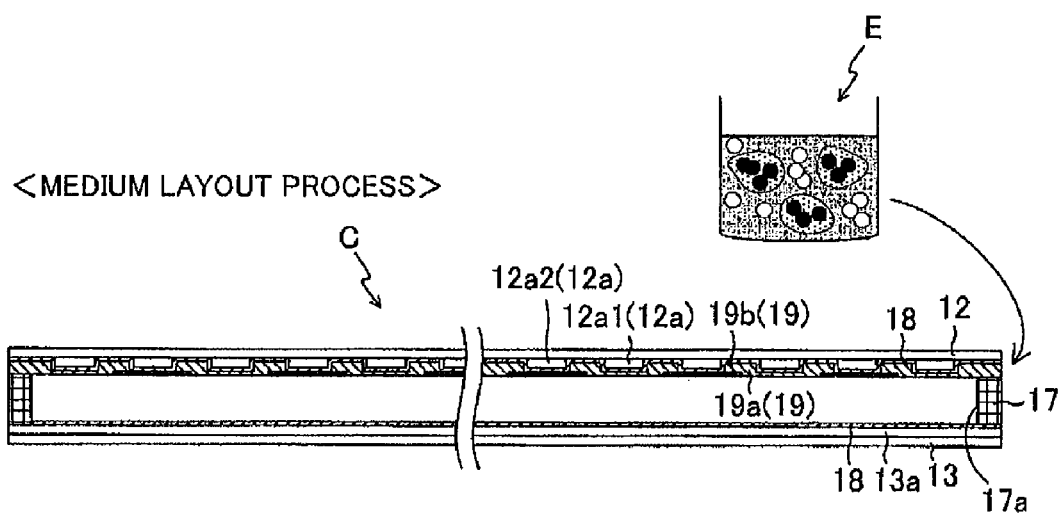
FIG. 14(a) illustrates a medium layout process up to the point of arranging the electrophoretic medium containing charged particles between substrates of the display medium.
Figure 14B:
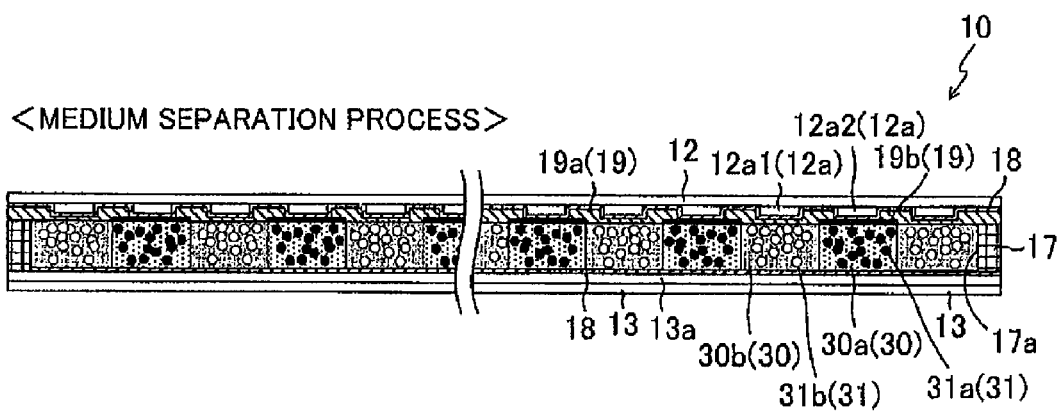
FIG. 14(b) illustrates a medium layout process up to the point of arranging the electrophoretic medium containing charged particles between substrates of the display medium.

Next, a method of arranging the electrophoretic medium 30 between the substrates of the display medium 10 (the first substrate 12 and second substrate 13) will be described with reference to FIG. 13 and FIGS. 14(a) and 14(b). FIG. 13 conceptually illustrates the preparation of the electrophoretic medium 30 containing the charged particles 31. FIGS. 14(a) and 14(b) illustrate a process of arranging the electrophoretic medium 30 containing the charged particles 31 between the substrates of the display medium 10 (the first substrate 12 and second substrate 13).

In order to prepare the electrophoretic medium 30 containing the charged particles 31 according to the preferred embodiment, the first step involves preparing the first medium 30a in which are dispersed first particles 31a having a surface with a greater affinity to the first medium 30a than the second medium 30b (hereinafter, this dispersion liquid is referred to as the "dispersion liquid Da"), and the second medium 30b in which are dispersed second particles 31b having a surface with a greater affinity to the second medium 30b than the first medium 30a (hereinafter, this dispersion liquid is referred to as the "dispersion liquid Db"). Next, the dispersion liquids Da and Db are mixed and stirred well to produce an emulsion in which the second medium 30b is dispersed in the first medium 30a, as shown in the bottom drawing of FIG. 13.

As will be described with reference to FIGS. 14(a) and 14(b), the electrophoretic medium 30 containing the charged particles 31 emulsified as described above (hereinafter the emulsion of the electrophoretic medium 30 will be referred to as the "emulsion E") is disposed between the first substrate 12 and second substrate 13. While FIG. 13 indicates an emulsion in which the second medium 30b is dispersed in the first medium 30a, it is also possible to use an emulsion in which the first medium 30a is dispersed in the second medium 30b.

As shown in FIG. 14(a), the emulsion E prepared as described above is disposed between the first substrate 12 and second substrate 13 according to the medium layout process. The medium layout process is performed by injecting the emulsion E with a dispenser or the like through injection holes (not shown) provided in pre-assembled cells C (configured of the first substrate 12 including the surface treatment part 19 in the topmost layer, the gap spacer 17, and the protective film 18 in the bottommost layer).

After injecting the emulsion E into the cells C in the medium layout process, the injection holes (not shown) are sealed. Subsequently, a medium separation process shown in FIG. 14(b) in performed. In the medium separation process, the emulsion E injected into the cells C spontaneously separates in phase so that the first medium 30a and second medium 30b can be selectively arranged at positions corresponding to the XA electrodes 12a1 and XB electrodes 12a2, respectively. More specifically, through the spontaneous phase-separation of the emulsion E injected into the cells C, the first medium 30a and second medium 30b are selectively laid out on the first surface treatment layer 19a and second surface treatment layer 19b, respectively. Further, when the emulsion E is phase-separated into the first medium 30a and second medium 30b, the first particles 31a, whose surface shows a greater affinity to the first medium 30a than the second medium 30b, are selectively dispersed in the first medium 30a, while the second particles 31b, whose surface shows a greater affinity to the second medium 30b than the first medium 30a, are selectively dispersed in the second medium 30b.

Hence, the method of the preferred embodiment uses the spontaneous phase-separation of the first medium 30a and second medium 30b and the selective layout of the first medium 30a and second medium 30b according to a difference in affinity with the first surface treatment layer 19a and second surface treatment layer 19b. Therefore, this method facilitates the production of the display medium 10 according to the preferred embodiment.

Figure 15:
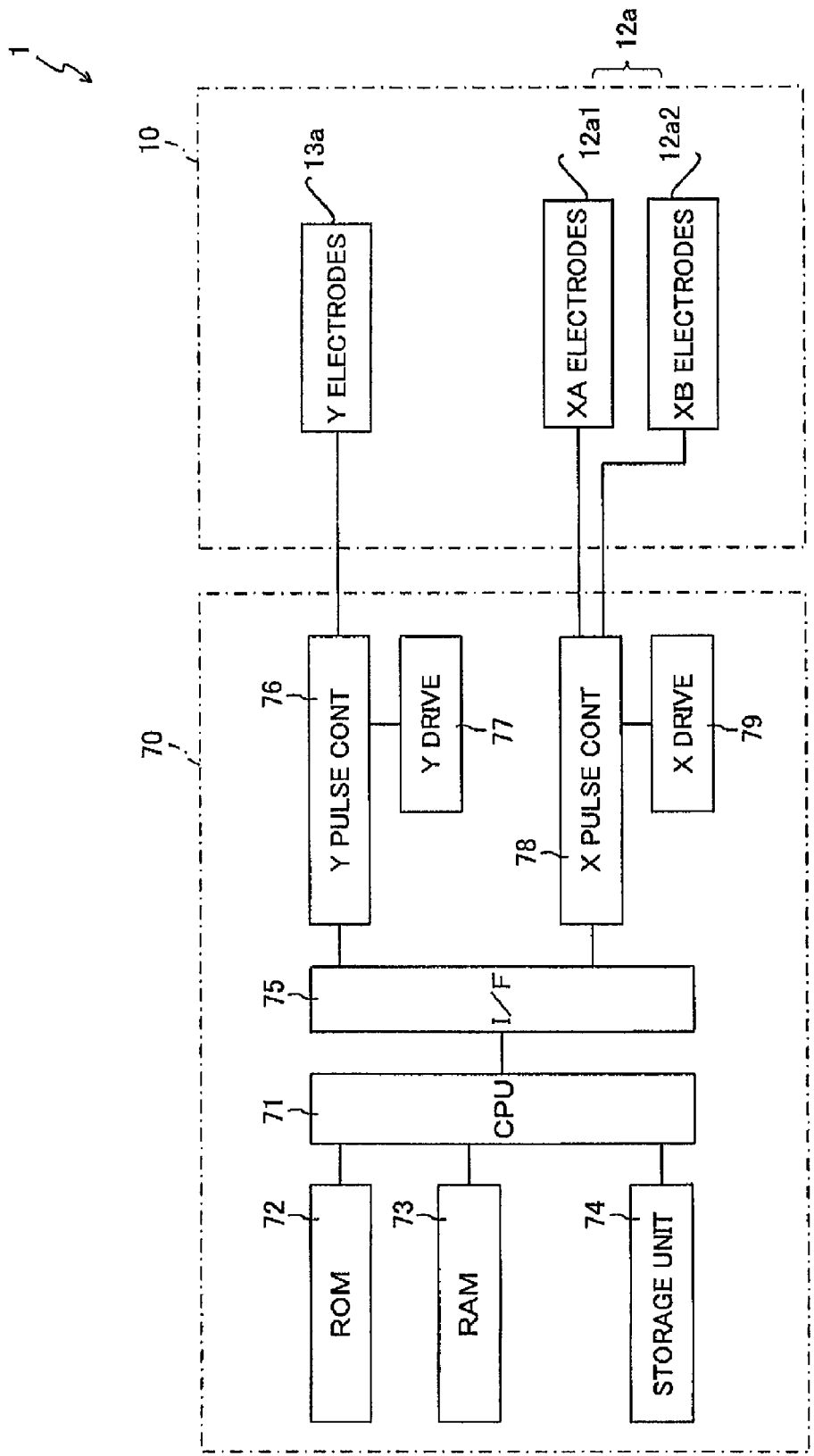
FIG. 15 is a block diagram showing the electrical structure of the display device for displaying images on the display medium according to the fourth embodiment.

Next, the method of controlling the display of images on the display medium 10 having this construction will be described with reference to FIG. 15. FIG. 15 is a block diagram showing the electrical structure of the display device 1 for displaying images on the display medium 10.

The display device 1 includes the display medium 10 and the main body 20, wherein the display medium 10 has the XA electrodes 12a1, XB electrodes 12a2, and Y electrodes 13a. The main body 20 includes the control unit 70 for controlling the display of images on the display medium 10. The control unit 70 includes a central processing unit (CPU) 71, a ROM 72, a RAM 73, a storage unit 74, an image interface 75 (image I/F 75), a Y pulse voltage control circuit 76, a Y drive source 77 for supplying a voltage to the Y pulse voltage control circuit 76, an X pulse voltage control circuit 78, and an X drive source 79 for supplying a voltage to the X pulse voltage control circuit 78.

The ROM 72 is a non-rewritable memory that stores control programs executed by the CPU 71, and data that the CPU 71 requires to execute the control programs. The control programs stored in the ROM 72 control the voltages applied to the XA electrodes 12a1, XB electrodes 12a2, and Y electrodes 13a formed in prescribed lines based on image data stored in the RAM 73 and storage unit 74.

The RAM 73 is a volatile memory for temporarily storing data and programs required by the CPU 71 to execute various processes and for temporarily storing image data inputted externally via an interface (not shown). The storage unit 74 is a nonvolatile memory, such as a hard disk, and stores image data and the like inputted externally via an interface (not shown). The CPU 71 processes image data stored in the RAM 73 and storage unit 74 and outputs the processed data to the image I/F 75.

The image I/F 75 functions to perform various processes on image data inputted from the RAM 73 and storage unit 74 by the CPU 71, such as a calibration process that accounts for electrical resistance and viscosity of the first medium 30a and second medium 30b. The image I/F 75 also functions to output the processed data to the Y pulse voltage control circuit 76 and X pulse voltage control circuit 78.

The Y pulse voltage control circuit 76 converts a voltage supplied from the Y drive source 77 to a drive pulse conforming to the signal received from the image I/F 75 and outputs the drive pulse to the Y electrodes 13a.

The X pulse voltage control circuit 78 converts a voltage supplied from the X drive source 79 to a drive pulse conforming to the signal received from the image I/F 75 and outputs the drive pulse to the XA electrodes 12a1 and XE electrodes 12a2. As a result of the calibration process performed by the image I/F 75, the X pulse voltage control circuit 78 outputs different drive pulses to the XA electrodes 12a1 and XB electrodes 12a2 corresponding to the characteristics of the first medium 30a and second medium 30b.

The Y pulse voltage control circuit 76 and X pulse voltage control circuit 78 described above apply voltages to the Y electrode 13a, XA electrodes 12a1, and XB electrodes 12a2, generating electric fields in the display medium 10 between the Y electrodes 13a and the XA electrodes 12a1 and XB electrodes 12a2.

The display medium 10 of the preferred embodiment uses two types of media, the first medium 30a and second medium 30b, as the electrophoretic medium 30. Since the different media also differ in electric resistance and viscosity, the first particles 31a in the first medium 30a and the second particles 31b in the second medium 30b behave (respond) differently when the same drive pulse is applied to the XA electrodes 12a1 and XB electrodes 12a2.

However, since the display device 1 controls the voltages applied to the XA electrodes 12a1 and XB electrodes 12a2 independently, different drive pulses are outputted to the electrodes based on the characteristics of the first medium 30a and second medium 30b so that the same electric field can be generated between the Y electrodes 13a and the X electrodes 12a (XA electrodes 12a1 and XB electrodes 12a2), even when using different media in the display medium 10 (the first medium 30a and second medium 30b). Accordingly, a uniform behavior (response) can be achieved between the first particles 31a and second particles 31b, ensuring a high-quality display.

As described above, the electrophoretic medium 30 in the display medium 10 of the fourth embodiment is configured of the first medium 30a that takes on a first color, and the second medium 30b that takes on a second color and is phase-separated from the first medium 30a at least at room temperature. Accordingly, regions of the first medium 30a and second medium 30b can be formed independently.

In this case, the first medium 30a and second medium 30b can easily and selectively be arranged in line shapes centered on the XA electrodes 12a1 and XB electrodes 12a2 by providing the first surface treatment layer 19a, having a greater affinity to the first medium 30a than the second medium 30b, and the second surface treatment layer 19b, having a greater affinity to the second medium 30b than the first medium 30a, on surfaces that contact the first medium 30a and second medium 30b so as to be arranged in alternating lines centered on the XA electrodes 12a1 and XB electrodes 12a2, respectively. Hence, the display medium 10 capable of displaying images in multiple colors can be manufactured easily according to a simple method.

By selectively arranging the first medium 30a and second medium 30b in lines centered on the XA electrodes 12a1 and XB electrodes 12a2 in this way, the display medium 10 can be configured to display multicolor images by configuring single pixels of neighboring regions of a first medium and a second medium when using different colors for the first medium 30a (first color) and the second medium 30b (second color), as in the preferred embodiment. Further, since the colors of the first medium 30a and second medium 30b function as color filters in this case, bright and vivid coloration can be produced even on electrophoretic reflection type display media, thereby maintaining images of a high quality.

The display device 1 of the fourth embodiment controls the voltages applied to the XA electrodes 12a1 and the XB electrodes 12a2 independently. Therefore, when using different media (the first medium 30a and second medium 30b) in the display medium 10, it is possible to output different drive pulses based on the characteristics of the first medium 30a and second medium 30b to generate the same electric field between the Y electrodes 13a and the X electrodes 12a (XA electrodes 12a1 and XB electrodes 12a2). Since this can effect a uniform behavior (response) in the first particles 31a and second particles 31b, it is possible to display high-quality images.

Next, the display medium 10 according to a fifth embodiment will be described, wherein like parts and components are designated with the same reference numerals to avoid duplicating description.

While the display medium 10 according to the fourth embodiment achieves a multicolor display by using the first medium 30a and second medium 30b having different colors, the display medium 10 according to the fifth embodiment produces a multicolor display by using the first medium 30a and second medium 30b of the same color, but using different colored first particles 31a and second particles 31b.

Except for using the same colored first medium 30a and second medium 30b and different colored first particles 31a and second particles 31b, the display medium 10 according to the fifth embodiment has an identical configuration to that in the fourth embodiment. In the fifth embodiment, the first medium 30a and second medium 30b used in the display medium 10 are preferably white or light in color.

In the display medium 10 according to the fifth embodiment, the user sees the color of the charged particles 31 when the colored charged particles 31 (first particles 31a and second particles 31b) migrate to the viewing surface (first substrate 12 side) Specifically, the user observes the color of the first particles 31a (blue, for example) when the charged particles 31 (first particles 31a) dispersed in the first medium 30a migrate to the viewing surface side and observes the color of the second particles 31b (red, for example) when the charged particles 31 (second particles 31b) dispersed in the second medium 30b migrate to the viewing surface side.

However, when the colored charged particles 31 (first particles 31a and second particles 31b) migrate to the side opposite the viewing surface, the user perceives the color of the first medium 30a or second medium 30b (white, for example). This state is the non-displayed state in the fifth embodiment.

Hence, as described in the fourth embodiment, a configuration such as that in the fifth embodiment, i.e. using the same color for the first medium 30a and second medium 30b but differing colors for the first particles 31a and second particles 31b contained in these media, can be used to display multicolor images on the display medium 10 by configuring single pixels of adjacent regions of the first medium 30a and second medium 30b.

Since the display medium 10 according to the fifth embodiment can display multicolor images using the colors of the first particles 31a and second particles 31b, the display medium 10 can produce brighter, more vivid displays than when separate color filters are provided on the viewing surface side, even when the display medium 10 is an electrophoretic reflection display medium.

As in the fourth embodiment, the control unit 70 built into the main body 20 of the display device 1 independently controls the voltages applied to the XA electrodes 12a1 and XB electrodes 12a2 in the display medium 10 according to the fifth embodiment. Hence, when using different media (the first medium 30a and second medium 30b) in the display medium 10, it is still possible to produce the same electric field between the Y electrodes 13a and the X electrodes 12a (XA electrodes 12a1 and XB electrodes 12a2) by outputting different drive pulses based on the characteristics of the first medium 30a and second medium 30b. As a result, it is possible to effect a uniform behavior (response) in the first particles 31a and second particles 31b to achieve a high-quality display.

While the invention has been described in detail with reference to specific embodiments thereof, it would be apparent to those skilled in the art that many modifications and variations may be made therein without departing from the spirit of the invention, the scope of which is defined by the attached claims.

For example, while the electrodes provided in the display medium 10 according to the preferred embodiments described above employ a simple matrix drive system, the present invention may also be applied to an active matrix drive system in which a voltage is directly applied to semiconductor switches provided for each pixel.

Further, while the surface treatment part 19 is only provided on one of the substrates (the first substrate 12) in the preferred embodiments, the surface treatment part 19 may be provided on both substrates (the first substrate 12 and second substrate 13). Further, the first surface treatment layer 19a and second surface treatment layer 19b may be provided on different substrates, such as providing the first surface treatment layer 19a on the first substrate 12 and the second surface treatment layer 19b on the second substrate 13.

Further, while the surface treatment part 19 is disposed on the first substrate 12, which is the viewing surface in the preferred embodiment, the surface treatment part 19 may be provided on the second substrate 13 instead.

Further, while the X electrodes 12a and Y electrodes 13a are provided on opposing surfaces of the first substrate 12 and second substrate 13 in the preferred embodiments, the X electrodes 12a and Y electrodes 13a may be omitted from the display medium 10. In this case, pairs of electrodes corresponding to the X electrodes 12a and Y electrodes 13a are provided on the main body 20 side, and the display device 1 may be configured to display images by interposing the display medium 10 having no X electrodes 12a or Y electrodes 13a between the pairs of electrodes provided on the main body 20.

In the preferred embodiments described above, the display medium 10 is capable of being separated from the main body 20 of the display device 1. However, the display medium 10 and main body 20 may be integrally configured in the display device 1.

Further, the preferred embodiments primarily described the first medium 30a as being water or an aqueous solution and the second medium 30b as being a water insoluble solvent or a solution containing such a solvent. However, both the first medium 30a and second medium 30b may be a water insoluble solvent or a solution containing such a solvent, provided that the two are phase-separated at least at room temperature.

In the first through third embodiments described above, the partitioning medium 32 forms partitions that surround each pixel. However, the partitioning medium 32 may also be configured to form partitions for surrounding a plurality of pixels.

Further, while the fixed partitions 14 are provided for surrounding each pixel in the third embodiment, the fixed partitions 14 instead may be provided partially as islands in the display region of the display medium 10 at positions not coinciding with the pixels. In this case, the partitions for delineating pixels are formed of both the fixed partitions 14 and the partitioning medium 32 that fills gaps between the fixed partitions 14.

In the fourth and fifth embodiments described above, only the gap spacer 17 is interposed between the first substrate 12 and second substrate 13. However, it is possible to add particle spacers between the first substrate 12 and second substrate 13 when assembling the cells C. The particle spacers present in the display medium 10 can maintain the first substrate 12 and second substrate 13 at a prescribed distance or greater.

Partitions that are to one substrate and separated from the other or partitions having communicating parts may be provided in place of the particle spacers in the fourth and fifth embodiments.

Further, while the medium layout process of the fourth and fifth embodiments described above involves injecting the emulsion E after assembling the cells C, the first medium 30a and second medium 30b may also be selectively arranged in positions corresponding to the XA electrodes 12a1 and XB electrodes 12a2, respectively, in another medium layout process implemented by applying the emulsion E to the first substrate 12 having the surface treatment part 19 according to the doctor blade method and subsequently having the emulsion E spontaneously phase-separate in the medium separation process. In this case, the gap spacer 17 is already laminated on the first substrate 12 when applying the emulsion E in the medium layout process. After completing the medium layout process, the display medium 10 is completed by placing the second substrate 13 over the gap spacer 17, without introducing air bubbles, and sealing the periphery.

In the fourth and fifth embodiments described above, the first particles 31a and second particles 31b are configured with the same color when the first medium 30a and second medium 30b are given different colors (fourth embodiment), or alternatively the first particles 31a and second particles 31b have different colors when the first medium 30a and second medium 30b are given the same color (fifth embodiment). However, it is also possible to give the first medium 30a and second medium 30b the same color and to give the first particles 31a and second particles 31b the same color.

In this case, images can be displayed in high resolution by configuring single pixels of adjacent regions of the first medium 30a and second medium 30b and using the control unit 70 in the main body 20 to independently control the voltages applied to the XA electrodes 12a1 and XB electrodes 12a2.

Further, in the fourth and fifth embodiments described above, the first particles 31a and second particles 31b dispersed in the respective first medium 30a or second medium 30b are configured of particles of a single color and are both positively or negatively charged. However, these particles may be configured of positively charged particles and negatively charged particles having a color different from the color of the positively charged particles.

Further, in the fourth and fifth embodiments described above, the first medium 30a and second medium 30b are arranged in stripes. However, the first medium 30a and second medium 30b may be configured in a checkered pattern, a honeycomb pattern, or the like. In such a case, the first medium 30a and second medium 30b can easily be laid out in the prescribed shape, such as the checkered pattern or the honeycomb pattern, by arranging the first surface treatment layer 19a and second surface treatment layer 19b in the same checkered pattern or honeycomb pattern.

What is claimed is:

1. A display medium comprising:
    a pair of substrates disposed in spaced-apart relation and substantially parallel to each other;
    an electrophoretic medium disposed between the pair of substrates and containing charged particles, whereby an electric field generated between the pair of substrates causes the charged particles contained in the electrophoretic medium to migrate for switching a display state;
    characterized in that the display medium further comprises a partitioning medium having fluidity and phase-separated from the electrophoretic medium at least at room temperature, the partitioning medium being in a phase-separated state phase-separated from the electrophoretic medium, wherein the partitioning medium is disposed between the pair of substrates as a partition to partition the electrophoretic medium; and
    a first surface treatment part having a greater affinity to the electrophoretic medium than the partitioning medium; and a second surface treatment part having a greater affinity to the partitioning medium than the electrophoretic medium; wherein the second surface treatment part is disposed on a surface of at least one of the pair of substrates in a position to which the partitioning medium contacts, in accordance with a shape of the partitioning medium, and the first surface treatment part is disposed on a surface of at least one of the pair of substrates in a position at which the electrophoretic medium is to be disposed.

2. The display medium according to claim 1, wherein the first surface treatment part and the second surface treatment part are transparent and are provided on the substrate that a user views as a display.

3. The display medium according to claim 1, wherein both the electrophoretic medium and the partitioning medium are solvents insoluble to each other, or solutions containing the solvent insoluble to each other.

4. The display medium according to claim 3, wherein one of the electrophoretic medium and the partitioning medium is water or an aqueous solution, while the other is a water insoluble solvent or a solution containing the water insoluble solvent.

5. The display medium according to claim 3, wherein the partitioning medium is water or an aqueous solution, and the electrophoretic medium is a water insoluble solvent or a solution containing the water insoluble solvent.

6. The display medium according to claim 3, wherein the water insoluble solvent is an aromatic hydrocarbon solvent, an aliphatic hydrocarbon solvent, a halogenated hydrocarbon solvent, a silicone oil, or a high-purity oil, or is a mixture including two or more thereof.

7. The display medium according to claim 1, wherein the partitioning medium is colorless or white in color.

8. The display medium according to claim 1, wherein the charged particle has a surface that has a greater affinity to the electrophoretic medium than the partitioning medium.

9. The display medium according to claim 1, further comprising: a pair of electrodes disposed on opposing surfaces of the pair of substrates respectively; and a protective film having a resistance to fluids and provided on the opposing surface of each electrode.

10. The display medium according to claim 9, wherein the protective film has a fluorine-containing compound.

11. The display medium according to claim 1, wherein the pair of substrates are both flexible.

12. The display medium according to claim 1, further comprising spacer particles disposed between the pair of substrates to maintain a prescribed distance between the pair of substrates.

13. The display medium according to claim 12, wherein the spacer particle has a surface that has a greater affinity to the partitioning medium than the electrophoretic medium.

14. The display medium according to claim 1, further comprising an aggregated fixed partition disposed between the pair of substrates and fixed to at least one of the pair of substrates.

15. The display medium according to claim 14, wherein the fixed partition is fixed to one of the pair of substrates and separated from the other substrate.

16. The display medium according to claim 15, wherein the partitioning medium is disposed between the fixed partition and the substrate separated from the fixed partition.

17. The display medium according to claim 15, wherein a surface of the fixed partition facing the substrate from which the fixed partition is separated or a surface of the substrate separated from the fixed partition has a greater affinity to the partitioning medium than the electrophoretic medium.

18. A display medium comprising:
a pair of substrates disposed in spaced-apart relation and substantially parallel to each other; charged particles;
an electrophoretic medium disposed between the pair of substrates and containing the charged particles, whereby an electric field generated between the pair of substrates causes the charged particles contained in the electrophoretic medium to migrate for switching a display state;
wherein the electrophoretic medium comprises a first medium that takes on a first color and a second medium that takes on a second color, the second medium being capable of being phase-separated from the first medium at least at room temperature, the second medium and the first medium that are phase-separated from each other forming a prescribed pattern;
a first surface treatment part having a greater affinity to the first medium than the second medium; and
a second surface treatment part having a greater affinity to the second medium than the first medium; wherein the first surface treatment part and the second surface treatment part are both disposed on a surface of at least one of the pair of substrate that contacts the electrophoretic medium in accordance with the prescribed pattern.

19. The display medium according to claim 18, wherein the first medium and the second medium are solvents insoluble to each other, or solutions containing the solvent insoluble to each other.

20. The display medium according to claim 19, wherein one of the first medium and the second medium is water or an aqueous solution, while the other is a water insoluble solvent or a solution containing the water insoluble solvent.

21. The display medium according to claim 20, wherein the water is distilled water or deionized water.

22. The display medium according to claim 20, wherein the water insoluble solvent is an aromatic hydrocarbon solvent, an aliphatic hydrocarbon solvent, a halogenated hydrocarbon solvent, a silicone oil, or a high-purity oil, or is a mixture including two or more thereof.

23. The display medium according to claim 18, wherein the charged particle includes a first particle having a surface that has greater affinity to the first medium than the second medium, and a second particle having a surface that has a greater affinity to the second medium than the first medium.

24. The display medium according to claim 23, wherein the first particle and the second particle are given different colors.

25. The display medium according to claim 18, wherein the first medium and the second medium are given different colors.

26. The display medium according to claim 18, further comprising: a pair of electrodes disposed on opposing surfaces of the pair of substrates respectively; and a protective film having a resistance to fluids and provided on the opposing surface of each electrode.

27. The display medium according to claim 26, wherein the protective film has a fluorine-containing compound.

28. The display medium according to claim 18, wherein the pair of substrates are both flexible.

29. The display medium according to claim 18, further comprising a spacer disposed between the pair of substrates to maintain a prescribed distance between the pair of substrates.

30. The display medium according to claim 18, wherein one of the pair of electrodes comprises a first electrode and a second electrode alternately disposed in spaced-apart relation, wherein the first medium is disposed at a position corresponding to a position of the first electrode and the second medium is disposed at a position corresponding to a position of the second electrode to form the prescribed pattern.

31. The display medium according to claim 30, further comprising: a first surface treatment-part having a greater affinity to the first medium than the second medium; and a second surface treatment part having a greater affinity to the second medium than the first medium; wherein the first surface treatment part is disposed on a surfaces of the first electrode, and the second surface treatment part is disposed on a surfaces of the second electrode.

32. An electrophoretic display device comprising: a display medium according to claim 30; and an electric field controlling unit that independently controls an electric field generated between the first electrode and an electrode opposing the first electrode and an electric field generated between the second electrode and an electrode opposing the second electrode.

33. The electrophoretic display device according to claim 32, wherein the electric field controlling unit independently controls the electric fields by applying voltages with different drive waveforms to the first electrode or the second electrode.

* * * * *